(12) United States Patent
Morishita

(10) Patent No.: US 7,164,251 B2
(45) Date of Patent: Jan. 16, 2007

(54) OSCILLATION ADJUSTER AND OSCILLATION ADJUSTING METHOD

(75) Inventor: Mimpei Morishita, Tokyo-To (JP)

(73) Assignee: Toshiba Elevator Kabushiki Kaisha, Tokyo-To (JP)

( * ) Notice: Subject to any disclaimer, the term of this patent is extended or adjusted under 35 U.S.C. 154(b) by 302 days.

(21) Appl. No.: 10/506,239

(22) PCT Filed: Mar. 12, 2003

(86) PCT No.: PCT/JP03/02931

§ 371 (c)(1),
(2), (4) Date: Sep. 8, 2004

(87) PCT Pub. No.: WO03/076823

PCT Pub. Date: Sep. 18, 2003

(65) Prior Publication Data

US 2005/0082993 A1 Apr. 21, 2005

(30) Foreign Application Priority Data

Mar. 12, 2002 (JP) ............................. 2002-066997

(51) Int. Cl.
*H02P 1/24* (2006.01)

(52) U.S. Cl. .................... 318/727; 318/461; 318/605; 318/432; 318/434; 187/292; 187/293

(58) Field of Classification Search ................ 318/432, 318/434, 727, 605, 461, 603, 632; 187/292, 187/293
See application file for complete search history.

(56) References Cited

U.S. PATENT DOCUMENTS 3,876,918 A * 4/1975 Komuro et al. ............. 318/743
4,269,286 A * 5/1981 Ishii et al. .................. 187/292
4,271,931 A 6/1981 Watanabe
4,516,664 A * 5/1985 Anzai et al. ................ 187/296
4,623,042 A * 11/1986 Kamaike .................... 187/296
5,243,154 A * 9/1993 Tomisawa et al. .......... 187/286
5,824,975 A * 10/1998 Hong ......................... 187/292
5,828,014 A 10/1998 Goto et al.
5,880,415 A * 3/1999 Colby et al. ................ 187/393

(Continued)

FOREIGN PATENT DOCUMENTS

GB 2 266 976 A 11/1993

(Continued)

Primary Examiner—Rina I. Duda
(74) Attorney, Agent, or Firm—Oblon, Spivak, McClelland, Maier & Neustadt, P.C.

(57) ABSTRACT

A vibration controller controls vibrations generated in a driven object included in a system subject to vibrations due to the dynamic unbalance or eccentricity of a rotating member driven for rotation by an electric motor. An angular position transforming unit (45) and an angular velocity transforming unit (47) transform the output signal of a rotating motion measuring means (C1) into an angular position and an angular velocity, respectively. A sine calculating unit (55) calculates the sine of an angle obtained by adding up the angular position and a predetermined phase angle provided by a phase adjusting unit (49) by an adder (53). A multiplier (61) calculates the product of the output of a gain adjusting unit (57) that multiplies the output of the sine calculating unit (55) by a predetermined gain and the output of a multiplier (59) that calculates the square of the angular velocity. Again adjusting unit (57') multiplies the output of a sine calculating unit (55') by a predetermined gain. An adder (68) adds up the respective outputs of the multiplier (61) the gain adjusting unit (57') and a specified torque calculating unit.

29 Claims, 12 Drawing Sheets

U.S. PATENT DOCUMENTS 5,929,400 A * 7/1999 Colby et al. ................ 187/393

FOREIGN PATENT DOCUMENTS

| JP | 07-129251 | 5/1995 |
| JP | 11-258076 | 9/1999 |
| JP | 11-299277 | 10/1999 |
| JP | 2001-139266 | 5/2001 |

* cited by examiner

OSCILLATION ADJUSTER AND OSCILLATION ADJUSTING METHOD

FIELD OF THE INVENTION

The present invention relates to a vibration controller for reducing vibrations of a driven object driven for movement by a driving force generating means with respect to directions of movement of the driven object, and a vibration control method of controlling such vibrations.

BACKGROUND ART

Generally, the output torque of a rotary machine, such as a motor, is transformed into driving force acting in a driving direction by combining a linkage, and belts or ropes with rotating members to drive a driven object for linear motions by the rotary machine. In such a system, if the rotating member is eccentric relative to a support mechanism with its axis of rotation not aligned with the axis of the support mechanism or if the center of gravity of the rotating member is not on the axis of rotation of the rotating member and the rotating member is dynamically unbalanced, the system vibrates and it is difficult to drive the driven object for desired movement. For example, in an elevator system, all the components of the elevator system driven by a motor are caused to move vertically in phase, and an elevator car included in the elevator system is vibrated vertically in synchronism with the rotation of the dynamically unbalanced rotating member to spoil ride quality.

Since the vibration mode of such in-phase vibrations of the components of the system is different from that of a rotating motion, the in-phase vibrations cannot be suppressed through the control of the torque of the motor. Therefore, a generally known in-phase vibration suppressing method improves the mechanical accuracy of the rotating member so that the eccentricity and dynamic unbalance of the rotating member may not be sources of vibrations. However, the method of improving the mechanical accuracy needs time for processing the rotating member and incorporating the rotating member into the system and hence increases the cost of the system.

The conventional in-phase vibration suppressing method needs to process rotating members included in a system highly accurately and to install the same highly accurately, needs to use material resistant to aging and fatigue due to vibrations, and needs to process the rotating members by advanced techniques. Consequently, the cost of the system increases inevitably to satisfy the desired ability and reliability of the system.

SUMMARY OF THE INVENTION

The present invention has been made in view of the foregoing circumstances and it is therefore an object of the present invention to provide a vibration controller capable of suppressing vibrations of a driven object of a system subject that is vibrated due to the dynamic unbalance or eccentricity of a rotating member, of meeting desired functions of the system, of reducing the cost of the system, and improving the reliability of the system.

In order to achieve the objectives, a vibration controller according to the present invention includes: a driving force generating means for driving a driven object; a rotating member driven for rotation by the driving force of the driving force generating means; a driving force specifying means for specifying a thrust or a torque to be generated by the driving force generating means; a rotating motion measuring means for measuring rotating motions of the rotating member; a rotation calculating means including an angular position transforming unit that provides an angular position of the rotating member on the basis of the output of the rotating motion measuring means, a trigonometric function processing unit that calculates a sine or a cosine of an angle expressed by a liner function of the angular position outputted from the rotating motion measuring means, and a gain adjusting unit that multiplies the output of the trigonometric function processing unit by a predetermined gain; and a specified driving force correcting means for correcting the output of the driving force specifying means on the basis of the result of calculation made by the rotation calculating means.

The rotation calculating means may further include a phase adjusting unit that provides a predetermined adjusting phase as an intercept of a linear function of the output of the angular position transforming unit. In this case, the angle expressed by the linear function of the angular position is obtained by adding the adjusting phase to the angular position, and the trigonometric function calculating unit calculates the sine or cosine of the angle obtained by adding the adjusting phase to the angular position.

The rotation calculating means may further include an angular velocity transforming unit that provides the angular velocity of the rotating member on the basis of the output of the rotating motion measuring means, and an angular velocity multiplying unit that multiplies the output of the trigonometric function calculating unit or the gain adjusting unit by the square of an angular velocity provided by the angular velocity transforming unit.

The rotation calculating means may further include an angular acceleration transforming unit that provides the angular acceleration of the rotating member on the basis of the output of the rotating motion measuring means, and an angular acceleration multiplying unit that multiplies the output of the trigonometric function calculating unit or the gain adjusting unit by the output of the angular acceleration transforming unit.

The specified driving force correcting means may include an adder that adds up the respective outputs of the driving force specifying means and the gain adjusting unit.

The specified driving force correcting means may include an adder that adds up the respective outputs of the driving force specifying means and the angular acceleration multiplying unit.

The specified driving force correcting means may include an adder that adds up the respective outputs of the angular acceleration multiplying unit and the angular velocity multiplying unit.

The specified driving force correcting means may further include an adder that adds up the respective outputs of the driving force specifying means, the angular velocity multiplying unit and the gain adjusting unit.

The specified driving force correcting means may further include an adder that adds up respective outputs of the driving force specifying means, the angular acceleration multiplying unit, the angular velocity multiplying unit, and the gain adjusting unit.

The rotation calculating means may calculate an eccentricity compensating value $F_{CD}$ for compensating the eccentricity of the rotating member by using Expression (1):

$$F_{CD}=G_1 \sin(\theta+\psi_1) \qquad (1)$$

where θ is the angular position, $G_1$ is a gain used by the gain adjusting unit, and $\psi_1$ is an adjusting phase used by the phase adjusting unit, and the specified driving force correcting means may correct the output of the driving force specifying means on the basis of the eccentricity compensation $F_{CD}$.

The rotation calculating means may calculate a dynamic unbalance compensating value $F_{UB}$ for compensating the dynamic unbalance of the rotating member by using Expression (2):

$$F_{UB}=G_2\omega^2 \sin(\theta+\psi_2) \qquad (2)$$

where θ is the angular position, ω is the angular velocity, $G_2$ is the gain used by the gain adjusting unit, and $\psi_2$ is the adjusting phase used by the phase adjusting unit, and the specified driving force correcting means may correct the output of the driving force specifying means on the basis of the dynamic unbalance compensating value $F_{CD}$.

The rotation calculating means may calculate an eccentricity-related unbalance compensating value $F_{CF}$ for compensating the eccentricity-related unbalance of the rotating member by using Expression (3):

$$F_{CF}=G_3(\omega^2 \sin(\theta+\psi_3)+\alpha \cos(\theta+\psi_3)) \qquad (3)$$

where θ is the angular position, ω is the angular velocity, α is the angular acceleration, $G_3$ is a gain used by the gain adjusting unit, and $\psi_3$ is an adjusting phase used by the phase adjusting unit, and the specified driving force correcting means may correct the output of the driving force specifying means on the basis of the eccentricity-related unbalance compensating value $F_{CF}$.

The rotation calculating means may include a gain changing means for setting the gain of the gain adjusting unit by changing a plurality of predetermined values according to the operating condition of the driven object.

The rotation calculating means may include a phase changing means for setting the phase of the phase adjusting unit by changing a plurality of predetermined values according to the operating condition of the driven object.

The rotation calculating means may include a phase setting device that sets the phase of the phase adjusting unit according to the rotating direction of the rotating member.

The angular position transforming unit may include an integrator for integrating the output of the angular velocity transforming unit.

The vibration controller may further include a vibration measuring means for measuring vibrations with respect to a direction in which the driven object is driven. The vibration measuring means may include an acceleration measuring means for measuring the acceleration of the driven object.

The rotating motion measuring means may include a resolver. The rotating motion measuring means may include a generator. The rotating motion measuring means may include an encoder.

The rotating member may be a rotor included in an electric motor. The rotating member may be a main sheave included in an elevator system. The rotating member may be a compensator sheave included in an elevator system.

The driven object may be an elevator car included in an elevator system.

The present invention also provides a method of controlling vibrations of a driven object included in a system including a driving force generating means for driving the driven object, a rotating member driven for rotation by the driving force of the driving force generating means, and a driving force specifying means for specifying a thrust or a torque to be generated by the driving force generating means, by correcting an output provided by the driving force specifying means by using a predetermined compensating value. The method includes: a rotating motion measuring step including a step of measuring the angular position of the rotating member; a calculating step including a step of obtaining a product of a sine or cosine of an angle as a linear function of the angular position and a gain, and calculating the compensating value on the basis of the product; and a gain determining step of determining a gain that reduces the amplitude of a predetermined vibrational component generated in the driven object to a minimum.

The calculating step may use an angle obtained by adding a predetermined adjusting phase value to the angular position as the angle that can be expressed by the linear function of the angular position, and the gain determining step may include a step of determining an adjusting phase value so that the amplitude of the predetermined vibrational component generated in the driven object to a minimum.

The rotating motion measuring step may include a step of determining the angular velocity of the rotating member, and the calculating step may calculate the compensating value on the basis of the product of the product of the sine or cosine and the gain and the angular velocity of the rotating member.

The angular position measuring step may include a step of determining the angular acceleration of the rotating member, and the calculating step may calculate the compensating value on the basis of the product of the product of the sine or cosine and the gain and the angular acceleration of the rotating member.

The present invention reduces effectively vibrations of a driven object included in a system in which vibrations are generated due to the eccentricity or dynamic unbalance of a rotating member driven by a motor, by using the torque of the motor or a thrust. If a plurality of rotating members are eccentric or dynamically unbalanced, the vibration controller is provided with a plurality of angular position calculating means respectively for vibrational components due to the rotating members to reduce the vibrational components effectively.

Centrifugal force $f_c$ represented by Expression (4) acts on the axis of rotation of the rotating member.

$$f_c=mr\omega^2 \qquad (4)$$

where m is the mass of the rotating member, r is the distance between the center of gravity of the rotating member and the axis of rotation, and ω is angular velocity.

The dynamic unbalance of the rotating member due to the centrifugal force $f_c$ causes the system to generate vibrations, and a component vibration, parallel to the direction in which the driven object is driven, of the vibrations exerts a force periodically on the driven object. Consequently, the driven object is caused to vibrate. Generally, the vibration of the driven object can be controlled by changing the rotative force of the motor into a driving force acting in the driving direction. However, when the entire system vibrates, it is very difficult to suppress vibrations by controlling the rotative force because a force changing mechanism for changing rotative force into linear driving force, formed by combining the rotating member with a linkage and belts or ropes, vibrates as well as the driving force generating means.

Shaking force $F_c$, i.e., a force generated by the rotating member dynamically unbalanced due to the centrifugal force $f_c$ and acting in the driving direction, is expressed by Expression (5).

$$F_c = f_c \sin(\theta + \psi) \tag{5}$$

where $\theta$ is the angular position of the dynamically unbalanced rotating member, and $\psi$ is phase difference between the shaking force and the angular position.

Expression (6) is obtained through Laplace transform L.

$$F_{ob}(s) = L[mr\omega^2 \sin(\theta + \psi)]H(s) \tag{6}$$

where $F_{ob}$ is shaking force, s is Laplace operator, and H(s) is shaking force transfer function representing the transfer of the shaking force $F_c$ to the shaking force $F_{ob}$ acting on the driven object.

The driving force specifying means executes the servo control of the driving force generating means so that the angular velocity $\omega_m$ of, for example, a driving sheave (rotating member) connected to the rotor of a motor coincides with a desired angular velocity $\omega_{m0}$, and the motor produces a torque coinciding with a specified torque $T_0$ provided by the driving force specifying means. Driving force $F_{m0}$ exerted to the driven object by the driving sheave is given by Expression (7).

$$F_{m0}(s) = r_m T_0(s) G(s) \tag{7}$$

where $r_m$ is the radius of the driving sheave, and G(s) is driving force transfer function representing the transfer of driving force from the driving sheave to the driven object. Specified torque $T_c$ is defined as Expression (8).

$$T_c = T_0 + \frac{k_m}{r_m} \omega^2 \sin(\theta + \phi) \tag{8}$$

where $\theta$ is the angular position of a dynamically balanced rotating member, $\omega$ is the angular velocity of the rotating member, $k_m$ is a gain adjustment parameter, and $\phi$ is phase adjustment parameter.

From Expression (7), driving force $F_{m0}$ that acts on the driven object when the specified torque $T_c$ is given is represented by Expression (9).

$$F_m(s) = F_{m0}(s) + L[k_m \omega^2 \sin(\theta + \phi)]G(s) \tag{9}$$

The driving force and the shaking force act on the driven object. From Expressions (6) and (9), effective force F, i.e., the sum of the driving force and the shaking force, is given by expression (10).

$$F(s) = F_{m0}(s) + L[k_m \omega^2 \sin(\theta + \phi)]G(s) + L[mr \omega^2 \sin(\theta + \psi)]H(s) \tag{10}$$

Supposing that $\omega$ in Expression (10) is fixed, $G_{db}$ and $\gamma_G$ are the gain and phase difference of G(s), and $H_{db}$ and $\gamma_H$ are the gain and phase difference of H(s), and $L^{-1}$ is inverse Laplace transform, the second and the third term of the right side of Expression (10) are expressed by Expressions (11) and (12), respectively.

$$L^{-1}[L[k_m \omega^2 \sin(\theta + \phi)]G(s)] = G_{db} k_m \omega^2 \sin(\theta + \phi + \gamma_G) \tag{11}$$

$$L^{-1}[L[mr\omega^2 \sin(\theta + \psi)]H(s)] = H_{db} mr \omega^2 \sin(\theta + \psi + \gamma_H) \tag{12}$$

Therefore, when the gain adjustment parameter $k_m$ and the phase adjustment parameter $\phi$ of Expression (8) are given by:

$$k_m = -\frac{H_{db}}{G_{db}} mr, \phi = \psi + \gamma_H - \gamma_G \tag{13}$$

the second and the third term of the right side of Expression (10) cancel each other and Expression (14) is obtained.

$$F(s) = F_{m0}(s) \tag{14}$$

Consequently, the vibrational component is eliminated from the effective force F acting on the driven object and the driven object can be driven as if the driven object is driven only by the driving force $F_{m0}$.

If $G(s) \approx H(s)$, Expression (15) is obtained from Expression (9).

$$F(s) = F_{m0}(s) + L[k_m \omega^2 \sin(\theta + \phi) + mr\omega^2 \sin(\theta + \psi)]G(s) \tag{15}$$

Therefore, if $$k_m = -mr, \phi = \psi \tag{16}$$

the vibrational component can be eliminated regardless of the value of the angular velocity $\omega$.

Supposing that the driven object is vibrated by an eccentric rotating member, displacement $z_d$ caused by an eccentricity with respect to the driving direction is given by:

$$z_d = r_d \sin(\theta_d + \psi_d) \tag{17}$$

where $r_d$ is the amplitude of the vibration of the rotating member due to the eccentricity of the rotating member, $\theta_d$ is the angular position of the rotating member, and $\psi_d$ is phase difference. Shaking force $F_d$ that acts on the driven object due to the displacement $z_d$ is given by Expression (18) obtained through Laplace transform L on an assumption that a shaking force transfer function from $z_d$ to $F_d$ is D(s).

$$F_d(s) = L[r_d \sin(\theta_d + \psi_d)]D(s) \tag{18}$$

The specified torque $T_d$ is defined as Expression (19), using the angular position $\theta_d$ of the eccentric rotating member.

$$T_d = T_0 + \frac{k_d}{r_m} \sin(\theta_d + \phi_d) \tag{19}$$

where $k_d$ is gain adjustment parameter, and $\phi_d$ is phase adjustment parameter. From Expression (7), driving force $F_m$ that acts on the driven object when the specified torque $T_d$ is given is given by Expression (20).

$$F_m(s) = F_{m0}(s) + L[k_d \sin(\theta_d + \phi_d)]G(s) \tag{20}$$

Since the effective force F that acts on the driven object is the sum of the forces represented by Expressions (18) and (20), the effective force F is expressed by Expression (21).

$$F(s) = F_{m0}(s) + L[k_d \sin(\theta_d + \phi_d)]G(s) + L[r_d \sin(\theta_d + \psi_d)]D(s) \tag{21}$$

If the angular velocity $\omega$ of the eccentric rotating member in Expression (21) is fixed, the second and the third term of the right side of Expression (21) are expressed by Expressions (22) and (23), respectively, in which the gain and phase difference of G(s) are $G_{db}$ and $\gamma_G$, the gain and phase difference of D(s) are $D_{db}$ and $\gamma_D$, and $L^{-1}$ indicates inverse Laplace transform $$L^{-1}[L[k_d \sin(\theta_d + \phi_d)]G(s)] = G_{db} k_d \sin(\theta_d + \phi_d + \gamma_G) \tag{22}$$

$$L^{-1}[L[r_d \sin(\theta_d + \psi_d)]D(s)] = D_{db} r_d \sin(\theta_d + \psi_d + \gamma_D) \tag{23}$$

Therefore, if the gain adjustment parameter $k_d$ and the phase adjustment parameter $\phi_d$ of Expression (19) are given by:

$$k_d = -\frac{D_{db}}{G_{db}} r_d, \quad \phi_d = \psi_d + \gamma_D - \gamma_G \tag{24}$$

the second and the third term of the right side of Expression (21) cancel each other. Consequently, the vibrational component is eliminated from the effective force F acting on the driven object and the driven object can be driven as if the driven object is driven only by the driving force $F_{m0}$.

If $G(s) \approx D(s)$, $$F(s) = F_{m0}(s) + L[k_d \sin(\theta_d + \phi_d) + r_d \sin(\theta_d + \psi_d)]G(s) \tag{25}$$

and, therefore, the vibrational component due to the eccentricity of the rotating member can be eliminated regardless of the angular velocity $\omega_d$ by satisfying Expression (26).

$$k_d = -r_d, \quad \phi_d = \psi_d \tag{26}$$

Suppose that the driven object is shook by the eccentricity-related shaking force of the eccentric rotating member. The eccentricity-related shaking force $F_r$ is obtained by multiplying the acceleration due to the displacement $z_d$ given by Expression (17) by mass $m_d$ shaken due to eccentricity. When $\omega_d$ is angular velocity at $\theta_d$ and $\alpha$ is angular acceleration at $\theta_d$, the eccentricity-related shaking force $F_r$ is given by Expression (27).

$$F_r = m_d r_d (-\omega_d^2 \sin(\theta_d + \psi_d) + \alpha \cos(\theta_d + \psi_d)) \tag{27}$$

Shaking force $F_d$ that acts on the driven object due to the eccentricity-related shaking force $F_r$ is expressed by Expression (28) obtained by Laplace transform L on an assumption that shaking force transfer function from $F_r$ to $F_d$ is $R(s)$.

$$F_d(s) = L[m_d r_d (-\omega_d^2 \sin(\theta_d + \psi_d) + \alpha \cos(\theta_d + \psi_d))]R(s) \tag{28}$$

Specified torque $T_r$ is defined as Expression (29), using angular position $\theta_d$ of the eccentric rotating member.

$$T_r = T_0 + \frac{k_r}{r_m}(-\omega_d^2 \sin(\theta_d + \phi_r) + \alpha \cos(\theta_d + \phi_r)) \tag{29}$$

where $k_r$ is gain adjustment parameter and $\phi_r$ is phase adjustment parameter. From Expression (7), driving force $F_m$ that acts on the driven object due to the specified torque $T_r$ is given by Expression (30).

$$F_m(s) = F_{m0}(s) + L[k_r(-\omega_d^2 \sin(\theta_d + \phi_r) + \alpha \cos(\theta_d + \phi_r))]G(s) \tag{30}$$

The effective force that acts on the driven object is the sum of the forces represented by Expressions (28) and (30). Therefore, $$F(s) = F_{m0}(s) + L[k_r(-\omega_d^2 \sin(\theta_d + \phi_r) + \alpha \cos(\theta_d + \phi_r))]G(s) + L[m_d r_d(-\omega_d^2 \sin(\theta_d + \psi_d) + \alpha \cos(\theta_d + \psi_d))]R(s) \tag{31}$$

If the angular velocity $\omega_d$ of the eccentric rotating member in Expression (31) is fixed, the angular acceleration $\alpha = 0$. Supposing that $G_{db}$ band $\gamma_G$ are the gain and phase difference of $G(s)$, and $R_{db}$ and $\gamma_R$ are the gain and phase difference of $R(s)$, and $L^{-1}$ is inverse Laplace transform, the second and the third term of the right side of Expression(31) are expressed by Expressions (11) and (12), respectively.

$$L^{-1}[L[k_r \omega_d^2 \sin(\theta_d + \phi_r)]G(s)] = G_{db} k_r \omega_d^2 \sin(\theta_d + \phi_r + \gamma_G) \tag{32}$$

$$L^{-1}[L[m_d r_d \omega_d^2 \sin(\theta_d + \psi_d)]R(s)] = R_{db} m_d r_d \omega_d^2 \sin(\theta_d + \psi_d + \gamma_R) \tag{33}$$

Therefore, if the gain adjustment parameter $k_r$ and the phase adjustment parameter $\phi_r$ of Expression (29) are given by:

$$k_d = -\frac{R_{db}}{G_{db}} m_d r_d, \quad \phi_r = \psi_d + \gamma_R - \gamma_G \tag{34}$$

the second and the third term of the right side of Expression (29) cancel each other. Consequently, the vibrational component is eliminated from the effective force F acting on the driven object and the driven object can be driven as if the driven object is driven only by the driving force $F_{m0}$.

If $G(s) \approx G(s)$, $$F(s) = F_{m0}(s) + L[k_r(-\omega_d^2 \sin(\theta_d + \phi_r) + \alpha \cos(\theta_d + \phi_r)) + m_d r_d(-\omega_d^2 \sin(\theta_d + \psi_d) + \alpha \cos(\theta_d + \psi_d))]G(s) \tag{35}$$

Therefore, the vibrational component due to the eccentricity of the rotating member can be eliminated regardless of the angular velocity $\omega_d$ when adjustment is made to meet conditions given by Expression (36).

$$k_r = -m_d r_d, \quad \phi_r = \psi_d \tag{36}$$

When eccentricity-related shaking force acts on a dynamically unbalanced, eccentric rotating member, $\theta = \theta_d$, and therefore the vibration of the driven object can be reduced by providing a specified torque T given by:

$$T = T_0 + \frac{k_m}{r_m} \omega_d^2 \sin(\theta_d + \phi) + \frac{k_d}{r_m} \sin(\theta_d + \phi_d) + \frac{k_r}{r_m}(-\omega_d^2 \sin(\theta_d + \phi_r) + \alpha \cos(\theta_d + \phi_r)) \tag{37}$$

and determining the adjustment parameters $k_m$, $k_d$, $k_r$, $\phi$, $\phi_d$ and $\phi_r$ so as to satisfy Expressions (13), (16), (24), (26), (34) and (36).

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Preferred embodiments of the present invention will be described with reference to the attached drawings.

First Embodiment

Figure 1:
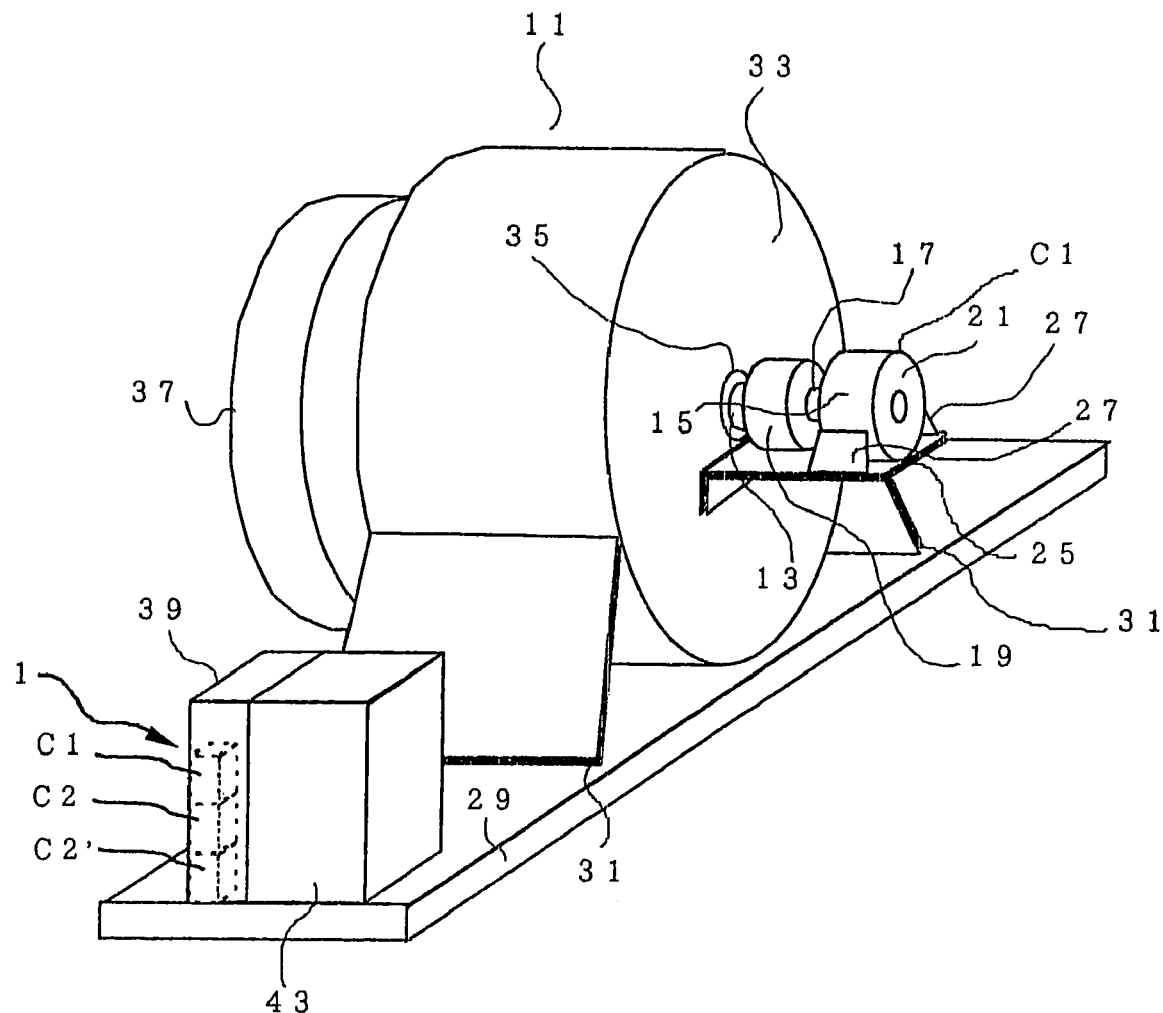
FIG. 1 is a perspective view of a vibration controller in a first embodiment according to the present invention.
Figure 2:
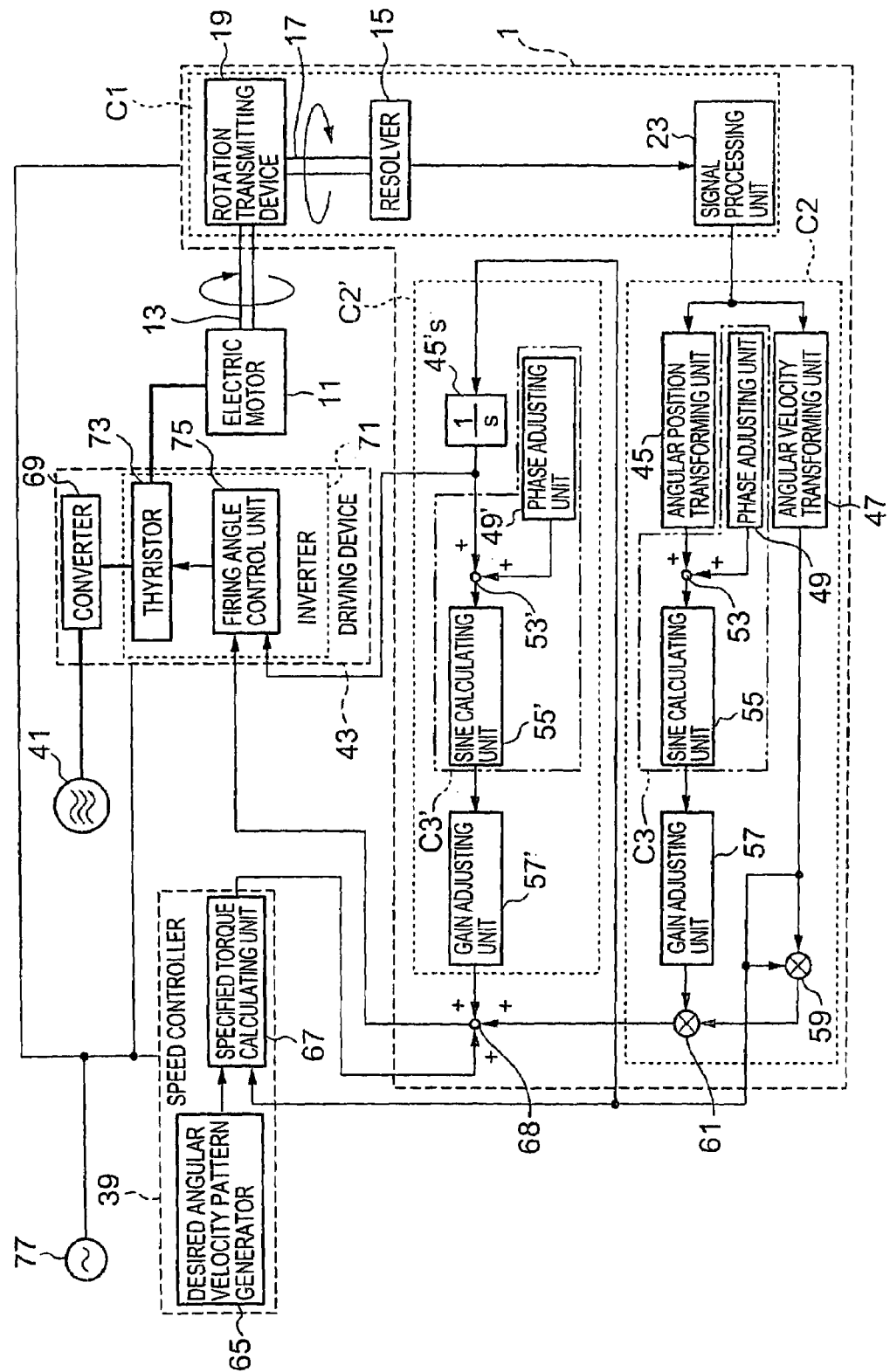
FIG. 2 is a block diagram of the vibration controller shown in FIG. 1.
Figure 3:
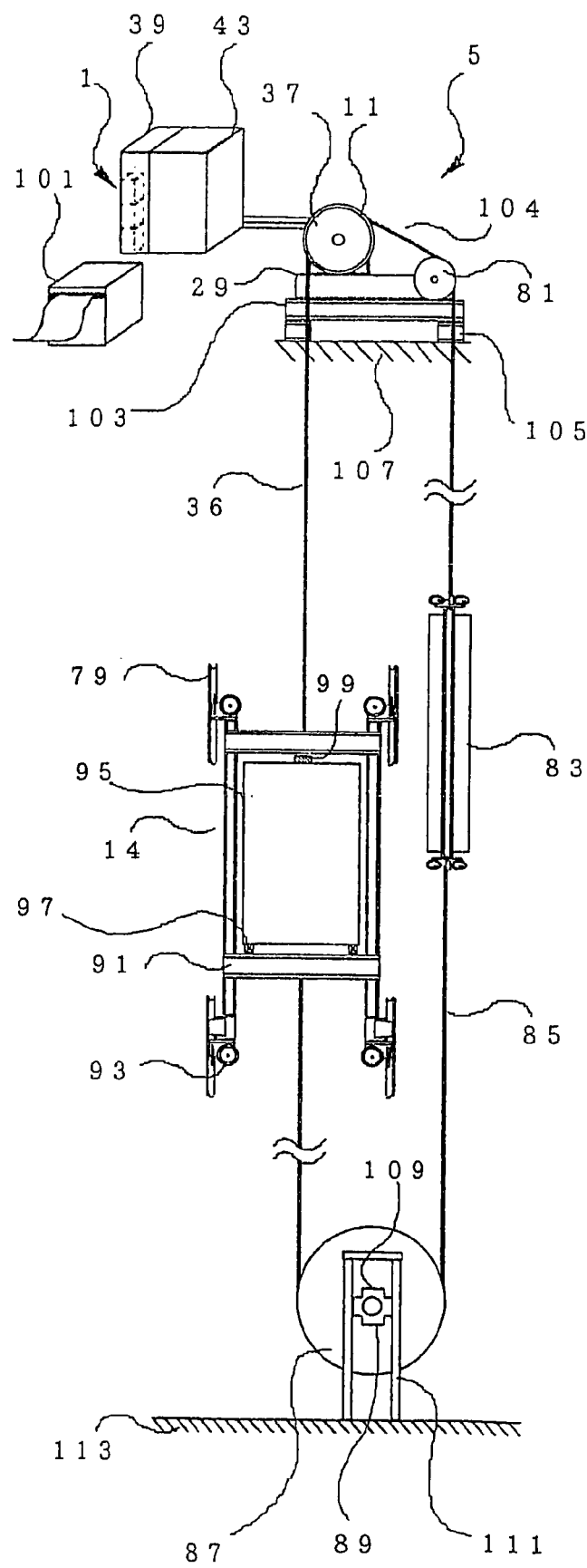
FIG. 3 is a schematic side elevation of an elevator system provided with the vibration controller in the first embodiment.

A vibration controller in a first embodiment according to the present invention is indicated generally at reference numeral 1 in FIGS. 1 to 3. In FIGS. 1 to 3, an elevator system is indicated at reference numeral 5. The elevator system 5 is provided with a rotary electric motor 11, which is a driving force generating means, and a moving object 14, which is a driven object. The vibration controller 1 is provided with a rotating motion measuring means C1, rotation calculating means C2 and C2'.

The rotating motion measuring means C1 is composed of: a resolver 15 associated with the electric motor 11 and capable of generating a voltage proportional to the angle of rotation of a rotor shaft 13 of the electric motor 11; an input shaft 17 directly connected to the rotor, not shown, of the resolver 15; and a rotation transmitting device 19 connected to the rotor shaft 13 and capable of transmitting the rotation of the rotor shaft 13 to the input shaft 17 of the resolver 15.

The rotation transmitting device 19 is provided with, for example, a universal joint or a coupler. The resolver 15 comprises the rotor, not shown, holding windings, and a stator 21 holding windings. The resolver 15 is provided with a signal processing unit 23 capable of generating voltages in the range of, for example, 0 to 5 V respectively corresponding to angular positions in the range of 0 to $2\pi$ (rad) from a predetermined origin. The stator 21 of the resolver 15 is held fixedly on a bracket 25 by holding members 27.

The electric motor 11, i.e., the driving force generating means, will be explained. The electric motor 11 is mounted on a base 29 and is held in place by holders 31, so that the motor 11 and the base 29 are integrated. The electric motor 11 includes, in addition to the rotor shaft 13, a stator housing 33 fixedly holding the stator of the electric motor 11 therein, a bearing 35 held on a central part of an end wall of the cylindrical stator housing 33 and supporting the rotor shaft 13 for rotation, a sheave 37, i.e., a rotating member, mounted on one end of the rotor shaft 13 to transmit the output torque, i.e., driving force, of the electric motor 11 through a rope 36 to the moving object 14, a speed controller 39 that calculates a specified torque for controlling the rotating speed of the rotor shaft 13 on the basis of the output of the vibration controller 1, and a driving device 43 that receives power from a three-phase ac power source 41 and makes the rotor shaft 13 generate a torque equal to the specified torque on the basis of the output of the speed controller 39.

The output of the rotating motion measuring means C1 is given to the rotation calculating means C2 and C2'. The rotation calculating means C2 includes: an angular position transforming unit 45 that transforms an output of the signal processing unit 23 into a corresponding angular position of the rotor shaft 13; an angular velocity transforming unit 47 that transforms the same output into a corresponding angular velocity of the rotor shaft 13; a phase adjusting unit 49 that adjusts the phase angle of the output of the angular position transforming unit 45; an adder 53 that adds up the output ($\psi_2$) of the phase adjusting unit 49 and the output ($\theta$) of the angular position transforming unit 45; a sine calculating unit 55 that receives the output ($\theta+\psi_2$) of the adder 53 and calculates the sine of the output ($\sin(\theta+\psi_2)$) of the adder 53; a gain adjusting unit 57 that multiplies the output of the sine calculating unit 55 by an adjustable gain, a multiplier 59 that squares the output ($\omega$) of the angular velocity calculating unit 47; and a multiplier 61, i.e., an angular velocity multiplier, that multiplies the output ($G_2 \sin(\theta+\psi_2)$) of the gain adjusting unit 57 by the output ($\omega^2$) of the multiplier 59. The phase adjusting unit 49, the adder 53 and the sine calculating unit 55 constitute a trigonometric function calculating device C3.

The rotation calculating means C2' includes an angular position transforming unit 45's, i.e., an integrator, that integrates angular velocity provided by the angular velocity transforming unit 47, a phase adjusting unit 49' that adjusts the phase angle of the output of the angular position transforming unit 45's, an adder 53' that adds up the output ($\psi_1$) of the phase adjusting unit 49' and the output ($\theta$) of the angular position transforming unit 45's, a sine calculating unit 55' that receives the output ($\theta+\psi_1$)) of the adder 53' and calculates the sine of the same output, and a gain adjusting unit 57' that multiplies the output ($\sin(\theta+\psi_1)$) of the sine calculating unit 55' by an adjustable gain $G_1$. The phase adjusting unit 49', the adder 53' and the sine calculating unit 55' constitute a trigonometric function calculating device C3'.

The speed controller 39 as a driving force specifying means, and the driving device 43 that serves together with the electric motor 11 as a driving force generating means will be described to facilitate understanding. The speed controller 39 includes a desired angular velocity pattern generator 65 that generates a desired angular velocity pattern in which the angular velocity of the rotor shaft 13 is to be controlled, and a specified torque calculating unit 67 that calculates a specified torque to control the angular velocity of the rotor shaft 13 so as to vary according to the desired angular velocity pattern on the basis of the respective outputs of the desired angular velocity pattern generator 65 and the angular velocity transforming unit 47. An adder 68, i.e., a composite vibration adjusting adder, adds up the respective outputs of the specified torque calculating unit 67, the multiplier 61 and the gain adjusting unit 57'. The driving device 43 includes a converter 69 for converting the ac power received from the three-phase ac power source 41 into corresponding dc power, and an inverter 71 that converts the dc power provided by the converter 69 into corresponding three-phase ac power on the basis of the respective outputs of the adder 68 and the angular position transforming unit 45's so that the electric motor 11 generates a torque equal to the output of the adder 68. The inverter 71 includes a firing angle control unit 73 that controls thyristor firing angle on the basis of the output of the adder 68 and the output of the angular position transforming unit 45's indicating the angular position of the sheave 37 so that a three-phase ac current necessary for the electric motor 11 to generate a predetermined torque is supplied to the electric motor 11, and a thyristor unit 73 that supplies a three-phase ac current to the electric motor 11 in response to the output of the firing angle control unit 75.

A single-phase ac power source 77 supplies power necessary for the operation of the vibration controller 1, the speed controller 39 and the driving device 43. In the following block diagrams, lines with an arrow represent signal lines, and thick lines represent power lines around the electric motor 11 and the vibration controller 1.

The elevator system 5 includes guide rails 79 installed in a vertical position by a predetermined method, the moving object 14 that moves vertically along the guide rails 79, a first rope 36 having one end connected to an upper part of the moving object 14 by a predetermined method, the sheave 37 and a secondary sheave 81 for inverting the direction of tension that is induced in the rope 36 in bearing the weight of the moving object 14, a counterweight 83 connected to the other end of the rope 36 by a predetermined method and having a weight substantially equal to the tension induced in the rope 36 by the weight of the moving object 14, the electric motor 11, a second rope 85 having one end connected to a lower part of the moving object 14 and the other end connected to the counterweight 83 by a predetermined method, a second sheave 87 suspended by the second rope 85 and capable of being turned by the second rope 85 and of tensioning the second rope 85 by its own weight, and a sheave support device 89 capable of damping the vertical movement of the second sheave 87 caused by the variation of the tension of the second rope 85 and of restraining the second sheave 87 from transverse movement.

The moving object 14 includes a frame 91 having a rigidity sufficient to withstand a tension exerted thereon by the ropes 36 and 85, guide roller units 93 arranged at the four corners of the frame 91 to guide the moving 14 along the guide rails 79, an elevator car 95 for carrying a load including persons, and a suspension 97 that intercepts the transmission of high-frequency longitudinal vibrations of the ropes 36 and 85 through the frame 91 to the car 95 and supports the car 95 on the frame 91. An acceleration measuring device 99, i.e., an acceleration measuring means, is attached to the car 95, i.e., a driven object, by a predetermined method to measure the vertical acceleration of the car 95. The output of the acceleration measuring device 99 is transmitted through a cable to an acceleration display 101 disposed near the rotation calculating means C2 and C2'. The acceleration display 101 records the varying measured acceleration on a recorder chart.

The electric motor 11 is mounted on the base 29 and the secondary sheave 81 is supported on the bed 29. The bed 29 is attached to a machine bed 103 by a predetermined method to form a motor unit 104. The machine bed 103 is installed on a top floor 107 of a building, not shown, and is supported on rubber vibration isolators 105. The secondary sheave 81 can be rotated by the tension of the rope 36.

The sheave support device 89 includes a bearing 109 supporting the sheave 87 for rotation, and a sheave guide 111 having members extending on the opposite sides of the bearing 109 to guide the sheave 87 for vertical movement. The lower end of the sheave guide 111 is fixed to the bottom floor 113 of the building.

The operation of the vibration controller 1 in the first embodiment will be described.

Figure 4:
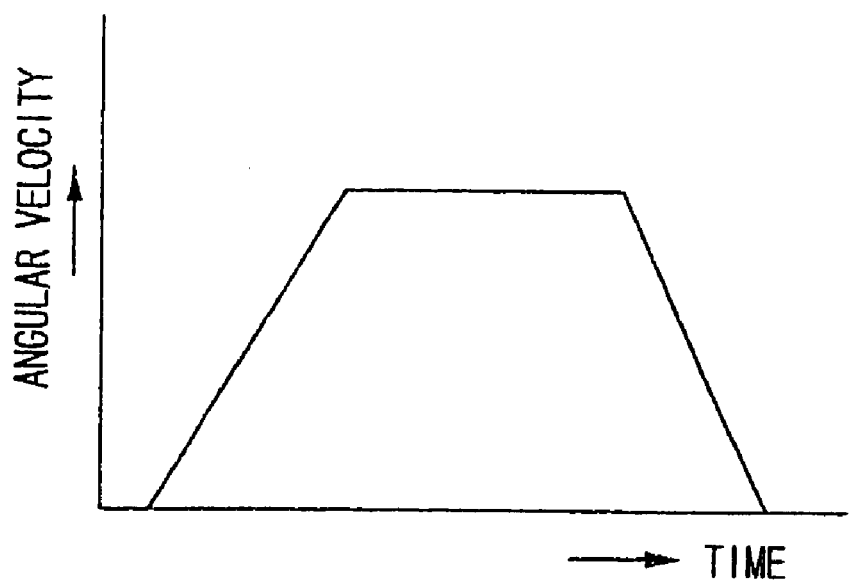
FIG. 4 is a graph showing a pattern of variation of specified angular velocity specified by the vibration controller in the first embodiment with time.
Figure 5:
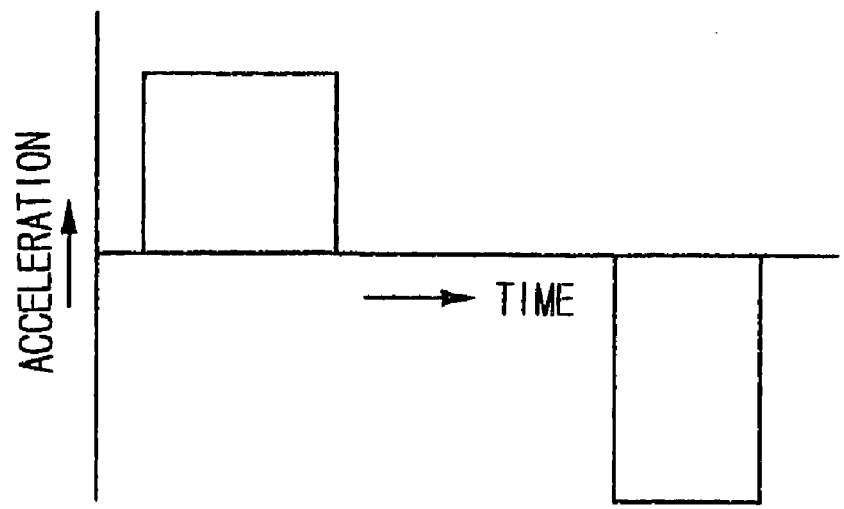
FIG. 5 is a graph showing a pattern of variation of acceleration specified by the vibration controller in the first embodiment with time.

In awaiting state of the system, where the driving device 43 is connected to the three-phase ac power source 41, the vibration controller is connected to the single-phase ac power source 77, the vibration controller 1, the speed controller 39 and the driving device 43 are in operation, and the output of the desired angular velocity pattern generator 65 is zero, the angular velocity of the rotor shaft 13 is zero. When the desired angular velocity pattern generator 65 generates a trapezoidal desired angular velocity pattern as shown in FIG. 4 and the angular velocity of the desired angular velocity starts increasing, the specified torque calculating unit 67 calculates a specified torque to be generated by the electric motor 11 on the basis of the present angular velocity of the rotor shaft provided by the angular velocity transforming unit 47 and a desired angular velocity provided by the desired angular velocity generating unit 65. The specified torque calculated by the specified torque calculating unit 67 is sent through the adder 68 to the driving device 43. The firing angle control unit 75 controls the firing angle of the thyristor unit 73 such that the electric motor 11 generates the specified torque. The inverter 71 supplies an excitation current to the electric motor 11 and the electric motor generates the specified torque. Consequently, the sheave 37 mounted on the rotor shaft 13 starts rotating. The rotation of the rotor shaft 13 is transmitted through the rotation transmitting device 19 and the input shaft 17 to the resolver 15. The signal processing unit 23 raises the output voltage according to the increase of the angular position of the rotor shaft 13. The angular position transforming unit 45 transforms the output voltage of the signal processing unit 23 into an angular position of the rotor shaft 13, and the angular velocity transforming unit 47 transforms the output voltage of the signal processing unit 23 into an angular velocity by, for example, a pseudo-differentiator. This angular velocity is fed back to the specified torque calculating unit 67 to control the rotation of the sheave 37 so that the rotating speed (angular velocity) of the sheave 37 follows the desired angular velocity pattern shown in FIG. 4. The tension of the rope 36 wound around the sheave 37 is transmitted to the moving object 14 to raise the moving object 14 at desired speed varying according to a desired speed pattern. FIG. 5 shows the variation of the acceleration of the moving object 14 with time.

If the sheave 37, i.e., the rotating member, is dynamically unbalanced, a centrifugal force represented by Expression (4) acts on the elevator system 5.

$$f_c = mr\omega^2 \tag{4}$$

(Refer to "Summary of the Invention" for the significance of quoted expressions.)

Consequently, vibrations are generated about the center of gravity of the motor unit 104 supported on the rubber vibration isolators 105, a vertical vibration component, i.e., a vibration component in the moving direction of the moving object 14, of the vibrations is propagated by the rope 36 to the moving object 14. Similarly, the vertical vibration component is propagated to the counter weight 83. The vertical vibration component is propagated further by the rope 85 to the sheave 87. Thus, the elevator system 5 is moved vertically.

A vertical shaking force acting on the motor unit 104 is given by Expression (5).

$$F_c = f_c \sin(\theta + \psi) \quad (5)$$

Figure 6:
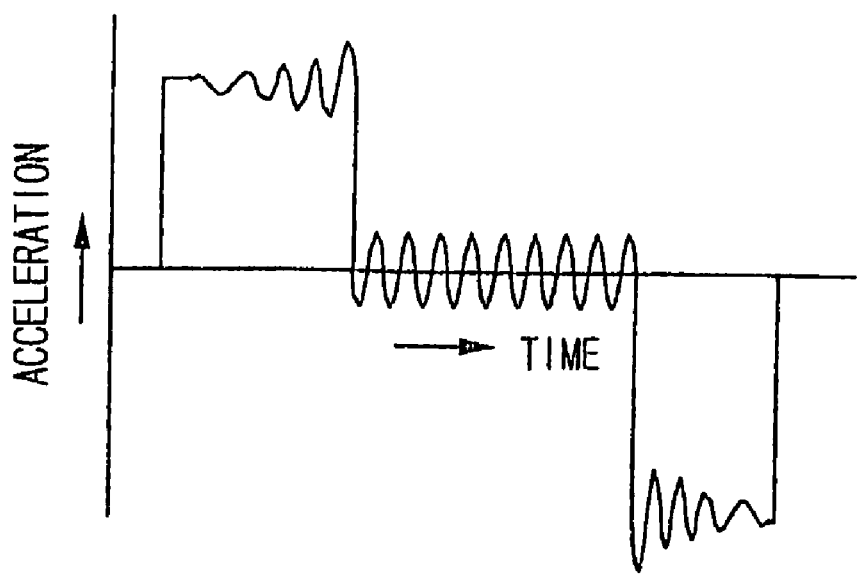
FIG. 6 is a graph showing a pattern of variation of acceleration specified by the vibration controller in the first embodiment with time.

A shaking force that acts on the moving object 14, due to the transmission of the above shaking force, is given by Expression (6), and the moving object 14 vibrates vertically in a vibration mode shown in FIG. 6.

$$F_{ob}(s) = L[mr\omega^2 \sin(\theta + \psi)]H(s) \quad (6)$$

If the moving object 14 thus vibrates vertically while the same is moving at a desired moving speed, the vertical vibrations of the moving object 14 is transmitted through the suspensions 97 to the car 95, that spoils ride quality greatly.

The vibration controller 1 of the present invention adds the output of the rotation calculating means C2 to the output of the specified torque calculating unit 67 to cancel out the shaking force given by Expression (6) that vibrates the moving object 14. The output of the rotating motion measuring means C1 is given to the angular position transforming unit 45, the adder 53 adds up an angular position ($\theta$) provided by the angular position transforming unit 45 and a predetermined phase angle ($\psi_2$) provided by the phase adjusting unit 49, and the sine calculating unit 55 calculates the sine ($\sin(\theta+\psi_2)$) of the output ($\theta+\psi_2$) of the adder 53. A present angular velocity ($\omega$) of the rotor shaft 13 provided by the angular velocity transforming unit 47 is given to the multiplier 59, and the multiplier 59 calculates the square of the angular velocity ($\omega^2$). The gain adjusting unit 57 multiplies the output of the sine calculating unit 55 by a predetermined gain ($G_2$). The multiplier 61 multiplies the output of the gain adjusting unit 57 by the square of the angular velocity ($\omega^2$) provided by the multiplier 59. The output of the multiplier 61 is that of the rotation calculating means C2; that is, the rotation calculating means C2 provides the result of calculation using Expression (2).

$$F_{UB} = G_2 \omega^2 \sin(\theta + \psi_2) \quad (2)$$

If the gain $G_2$ and the phase difference $\psi_2$ in Expression (2) are equal to a gain $k_m$ and a phase difference $\phi$ expressed by Expression (13) or (16), the shaking force acting on the moving object 14 is cancelled out, the moving object 14 does not vibrate vertically and ascends smoothly.

$$k_m = -\frac{H_{db}}{G_{db}} mr, \phi = \psi + \gamma_H - \gamma_G \quad (13)$$

$$k_m = -mr, \phi = \psi \quad (16)$$

When the moving object 14 is to descend, a desired angular velocity pattern obtained by multiplying the desired angular velocity pattern shown in FIG. 4 by −1 may be generated by the desired angular velocity pattern generator 65. In this state also, the relations represented by Expressions (13) and (16) are valid. Therefore, the condition represented by Expression (14) is satisfied and hence the moving object 14 descends smoothly.

$$F(s) = F_{m0}(s) \quad (14)$$

If the sheave 37 mounted on the rotor shaft 13 is eccentric, the sheave 37 is forced to move vertically by a vertical displacement given by Expression (17). This displacement, similarly to the centrifugal force, affects the operation of the elevator system 5.

$$z_d = r_d \sin(\theta_d + \psi_d) \quad (17)$$

A shaking force due to the displacement is given by Expression (18). The shaking force causes the moving object 14 to vibrate vertically.

$$F_d(s) = L[r_d \sin(\theta_d + \psi_d)]D(s) \quad (18)$$

The vibration controller 1 of the present invention adds the output of the rotation calculating means C2' to the output of the specified torque calculating unit 67 to cancel out the shaking force given by Expression (18) that vibrates the moving object 14. The output ($\omega$) of the angular velocity transforming unit 47 is given to the angular position transforming unit 45's, the adder 53' adds up an angular position ($\theta$) provided by the angular position transforming unit 45's and a predetermined phase angle ($\psi_1$) provided by the phase adjusting unit 49', and the sine calculating unit 55' calculates the sine ($\sin(\theta+\psi_1)$) of the output ($\theta+\psi_1$) of the adder 53'. The gain adjusting unit 57' multiplies the output of the sine calculating unit 55' by a predetermined gain ($G_1$) to obtain an output of the rotation calculating means C2'.

Result of calculation using Expression (1) is provided by the rotation calculating means C2' for the angular position and the angular velocity of the rotor shaft 13.

$$F_{CD} = G_1 \sin(\theta + \psi_1) \quad (1)$$

If the gain $G_1$ and the phase difference $\psi_1$ in Expression (1) are equal to a gain $k_d$ and a phase difference $\phi_d$ expressed by Expression (24) or (26), the shaking force acting on the moving object 14 is cancelled out, the moving object 14 does not vibrate vertically and ascends smoothly.

$$k_d = -\frac{D_{db}}{G_{db}} r_d, \phi_d = \psi_d + \gamma_D - \gamma_G \quad (24)$$

$$k_d = -r_d, \phi_d = \psi_d \quad (26)$$

When the moving object 14 is to descend, a desired angular velocity pattern obtained by multiplying the desired angular velocity pattern shown in FIG. 4 by −1 may be generated by the desired angular velocity pattern generator 65. The moving object 14 descends smoothly.

Although the vibration controller 1 in the first embodiment has been described as applied to controlling the compound vertical vibrations of the moving object 14 due to the dynamic unbalance and eccentricity of the sheave 37, the gains $G_2$ and $G_1$ and the phase differences $\psi_2$ and $\psi_1$ can be adjusted by the following adjusting procedure.

(1) All the gains $G_2$ and $G_1$ and the phase differences $\psi_2$ and $\psi_1$ are set to zero. In this state, the acceleration display displays vertical vibrations of the moving object 14 as shown in, for example, FIG. 7 greater than that shown in FIG. 6.

(2) The gain $G_1$ is increased gradually, and the moving object 14 is raised and lowered repeatedly until a change occurs in the amplitude of the vertical vibrations.

Figure 7:
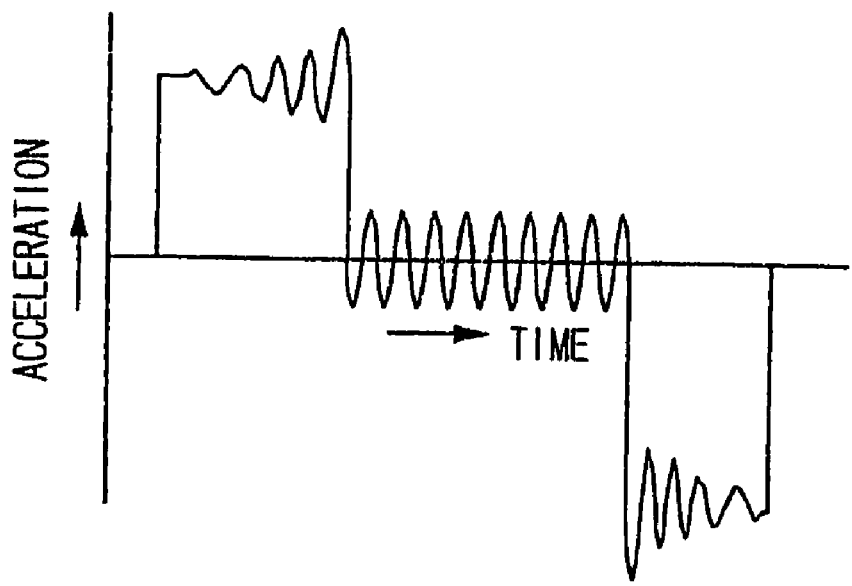
FIG. 7 is a graph showing a pattern of variation of acceleration specified by the vibration controller in the first embodiment with time.

(3) The gain $G_1$ is fixed upon the occurrence of a change in the amplitude of the vibrations shown in FIG. 7.

(4) The moving object 14 is raised and lowered repeatedly while the phase difference $\psi_1$ is increased (decreased), and the phase difference $\psi_1$ is fixed upon the decrease of the amplitude of vertical vibrations of the moving object 14 to a minimum.

(5) The moving object 14 is raised and lowered repeatedly while the gain $G_1$ is increased (decreased), and the gain $G_1$ is fixed upon the decrease of the amplitude of vertical vibrations of the moving object 14 to a minimum. This operation makes the gain $G_1$ and the phase difference $\psi_1$ coincide with the gain $k_d$ and the phase difference $\phi_d$, respectively. Thus, the vertical vibrations of the moving object 14 due to eccentricity are cancelled out, and the vibration waveform shown in FIG. 6 is displayed by the acceleration display 101.

(6) The moving object 14 is raised and lowered repeatedly until a change occurs in the amplitude of the vertical vibrations shown in FIG. 6, while the gain $G_2$ is increased gradually.

(7) The gain $G_2$ is fixed upon the occurrence of a change in the amplitude of the vibrations shown in FIG. 6.

(8) The moving object 14 is raised and lowered repeatedly while the phase difference $\psi_2$ is increased (decreased), and the phase difference $\psi_2$ is fixed upon the decrease of the amplitude of vertical vibrations of the moving object 14 to a minimum.

(9) The moving object 14 is raised and lowered repeatedly while the gain $G_2$ is increased (decreased), and the gain $G_2$ is fixed upon the decrease of the amplitude of vertical vibrations of the moving object 14 to a minimum. This operation makes the gain $G_2$ and the phase difference $\psi_2$ coincide with the gain $k_m$ and the phase difference $\phi$, respectively. Thus, the vertical vibrations of the moving object 14 due to dynamic unbalance are cancelled out, and the acceleration waveform shown in, for example, FIG. 5 is displayed by the acceleration display 101 to enable the confirmation of the elimination of the vertical vibrations.

Thus, the vibration controller 1 in the first embodiment eliminates the vertical vibrations of the moving object 14 due to the dynamic unbalance and eccentricity of the sheave 37 attributable to the mechanical inaccuracy of the sheave 37 through torque control. Therefore, the required performance of the elevator system, such as the grade of ride quality evaluated in terms of the acceleration of the car 95, and excellent ride quality can be insured without depending on the rigidity of the elevator system and machining accuracy. Since the elevator system does not need special reinforcement and component members of high-strength materials, the elevator system can be constructed at low costs.

Although the vibration controller 1 in the first embodiment is provided with the two rotation calculating means to deal with the compound vertical vibrations of the moving object 14 due to dynamic balance and eccentricity, the number of rotation calculating means is not limited to two, and the vibration controller may be provided with any necessary number of rotation calculating means corresponding to the number of dynamically unbalanced or eccentric rotating members.

The dynamically unbalanced and eccentric rotating member is not limited to the sheave, the dynamically unbalanced and eccentric rotating member may be any member, such as the rotor of the electric motor.

Although the rotating motion measuring means is provided with the resolver, the construction of the rotating motion measuring means is not limited thereto and various changes may be made in the rotating motion measuring means. For example, a generator capable of generating a voltage proportional to the angular velocity of the input shaft may be used.

Figure 8:
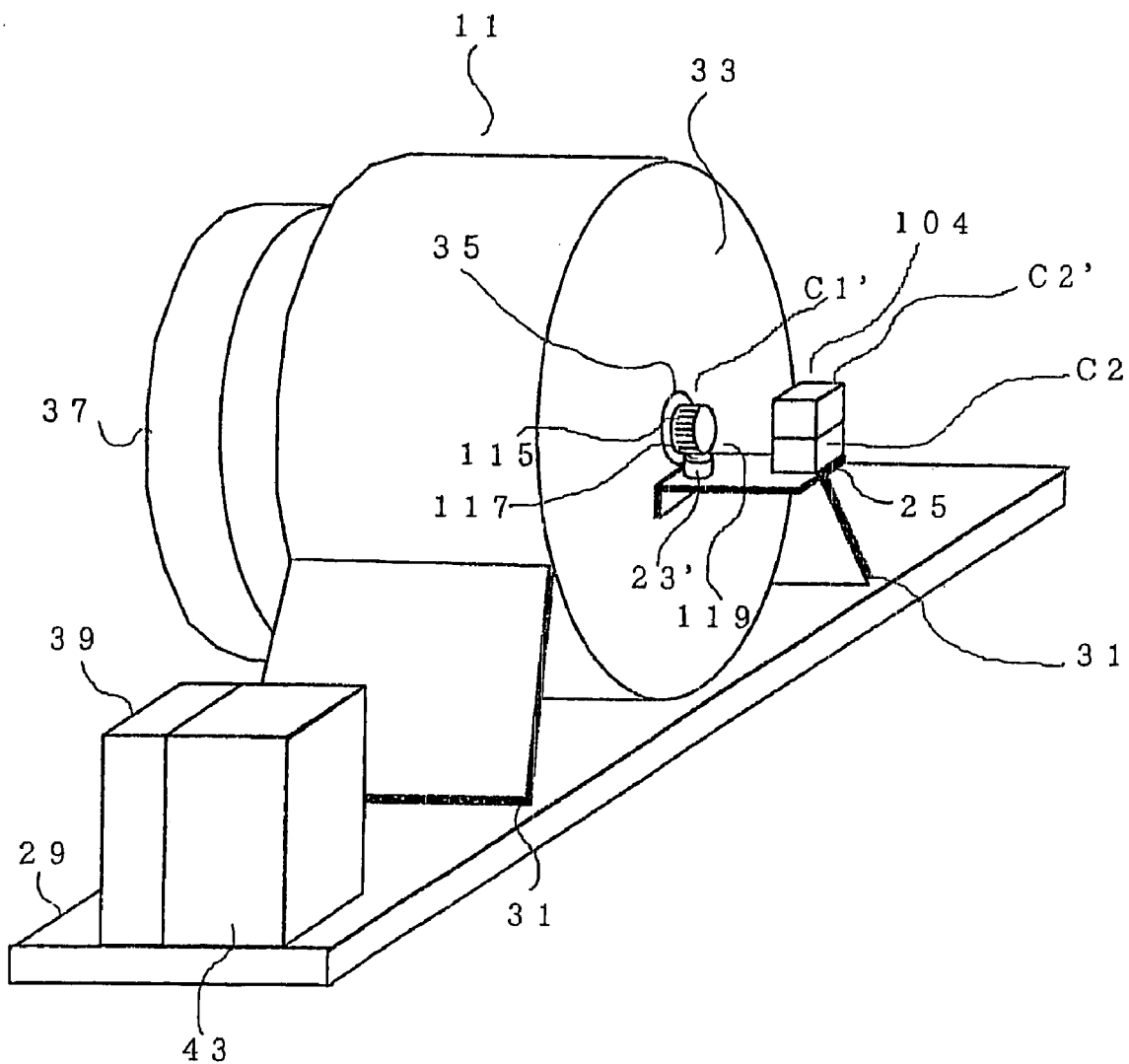
FIG. 8 is a perspective view of a vibration controller in a first modification of the vibration controller in the first embodiment.
Figure 9:
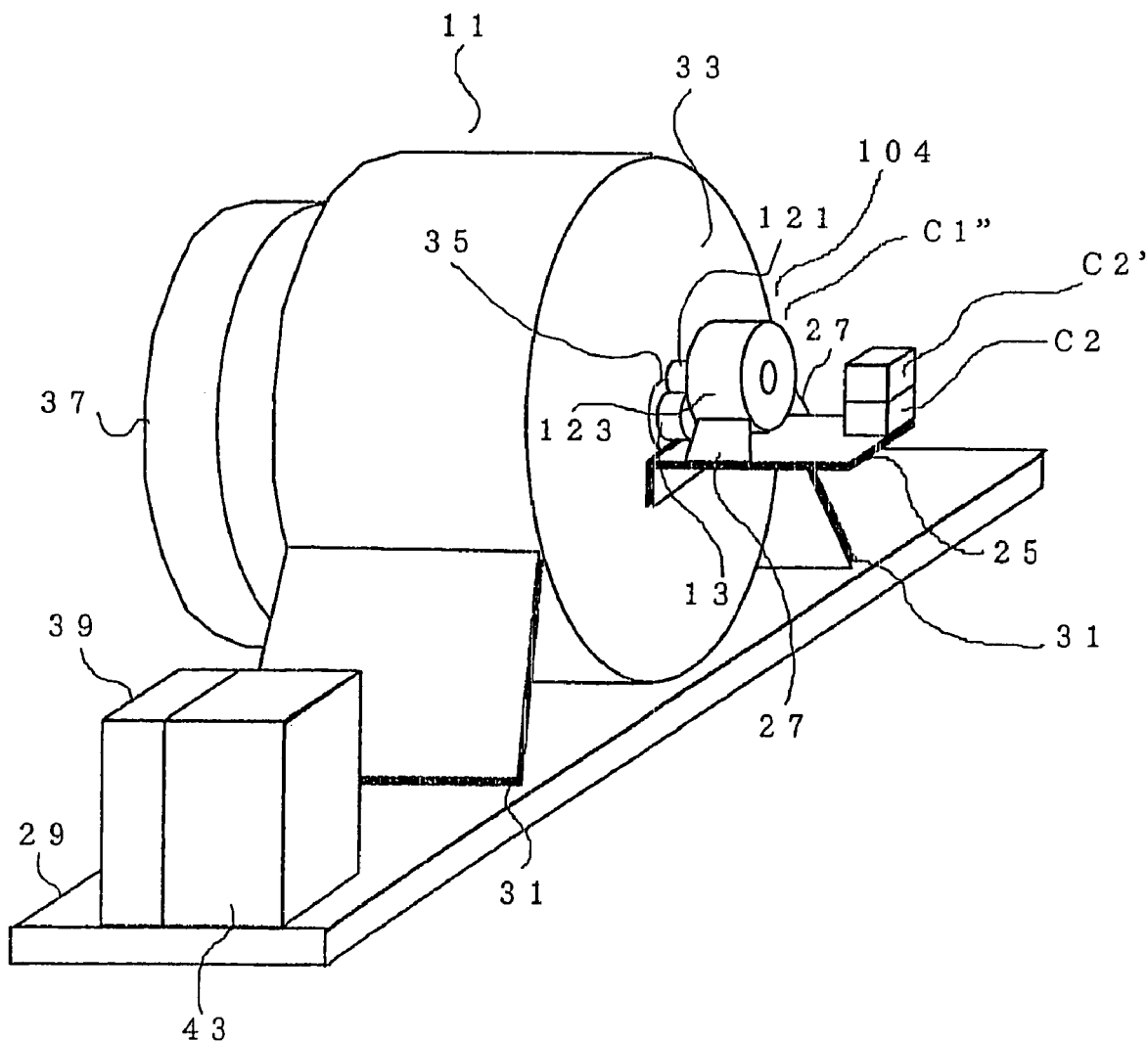
FIG. 9 is a perspective view of a vibration controller in a second modification of the vibration controller in the first embodiment.

Moreover, although the rotation of the output shaft of the electric motor 11 is transmitted by the rotation transmitting device 19 and the input shaft 17 to the rotor of the resolver, such a method of using the rotation transmitting device 19 and the input shaft 17 does not place any restrictions on the form of the rotation transmitting device 19 and the use of the input shaft 17. For example, a rotating motion measuring means C1' may be an optical encoder 119 including serrations 115 cut at equal angular intervals in an end part of the rotor shaft 13, and a signal processing unit 23' provided with an optical sensor 117 for detecting the serrations 115 as shown in FIG. 8. A rotating motion measuring means C1" may be such as capable of transmitting the rotation of the rotor shaft 13 through a roller 121, i.e., a rotation transmitting means, to a rotary encoder 123 as shown in FIG. 9.

Although the vibration controller 1, the speed controller 39 and the driving device 43 are disposed separately, there are not any restrictions on the arrangement and places of the vibration controller 1, the speed controller 39 and the driving device 43. The vibration controller may be entirely or partly included in the speed controller or the driving device or the vibration controller and the speed controller may be included in the driving device.

Second Embodiment

A vibration controller 1' in a second embodiment according to the present invention will be described with reference to FIGS. 10 and 11. The vibration controller 1 in the first embodiment is provided with the two parallel rotation calculating means C2 and C2' on an assumption that the rotating member is the dynamically unbalanced, eccentric sheave 37. The vibration controller 1' in the second embodiment will be described as applied to controlling the vibrations of a system including dynamically unbalanced sheaves 37 and 87 respectively having negligible eccentricities.

The vibration controller 1' is provided with rotating motion measuring means C1 and C1' respectively for measuring the rotation of the sheaves 37 and 84, and rotation calculating means C2 and C2" of the same configuration.

Figure 10:
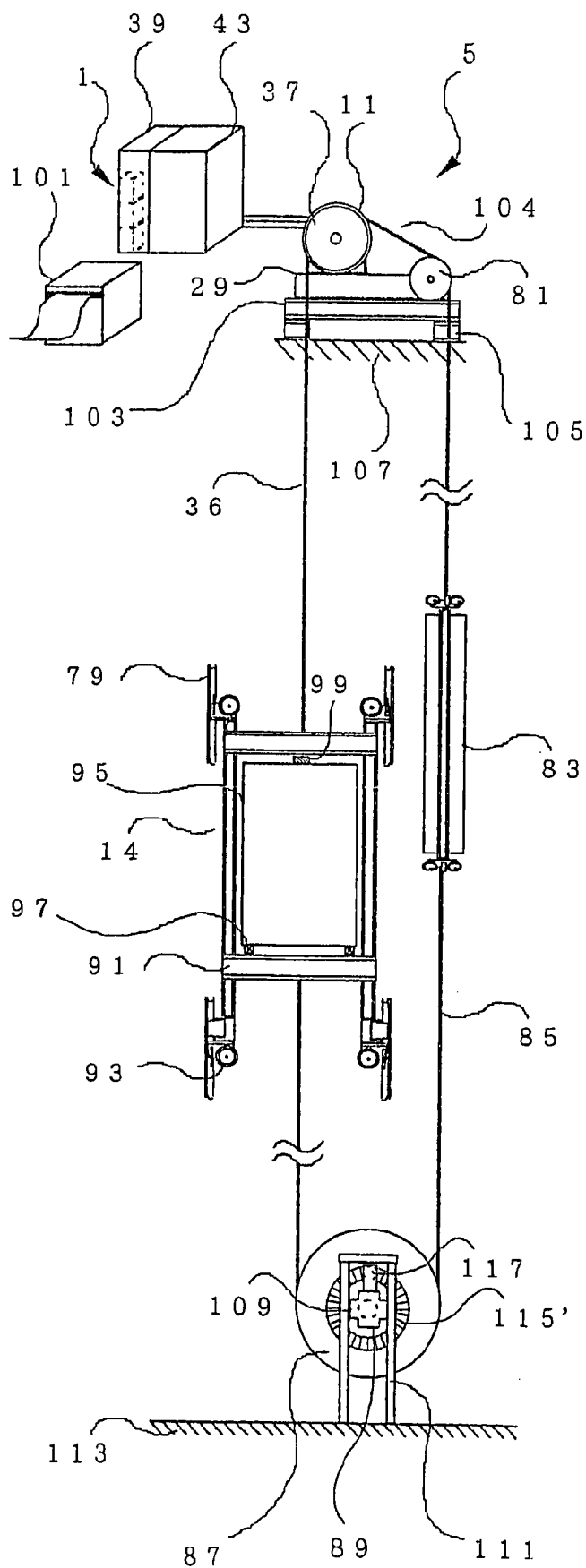
FIG. 10 is a schematic side elevation of an elevator system provided with a vibration controller in a second embodiment according to the present invention.
Figure 11:
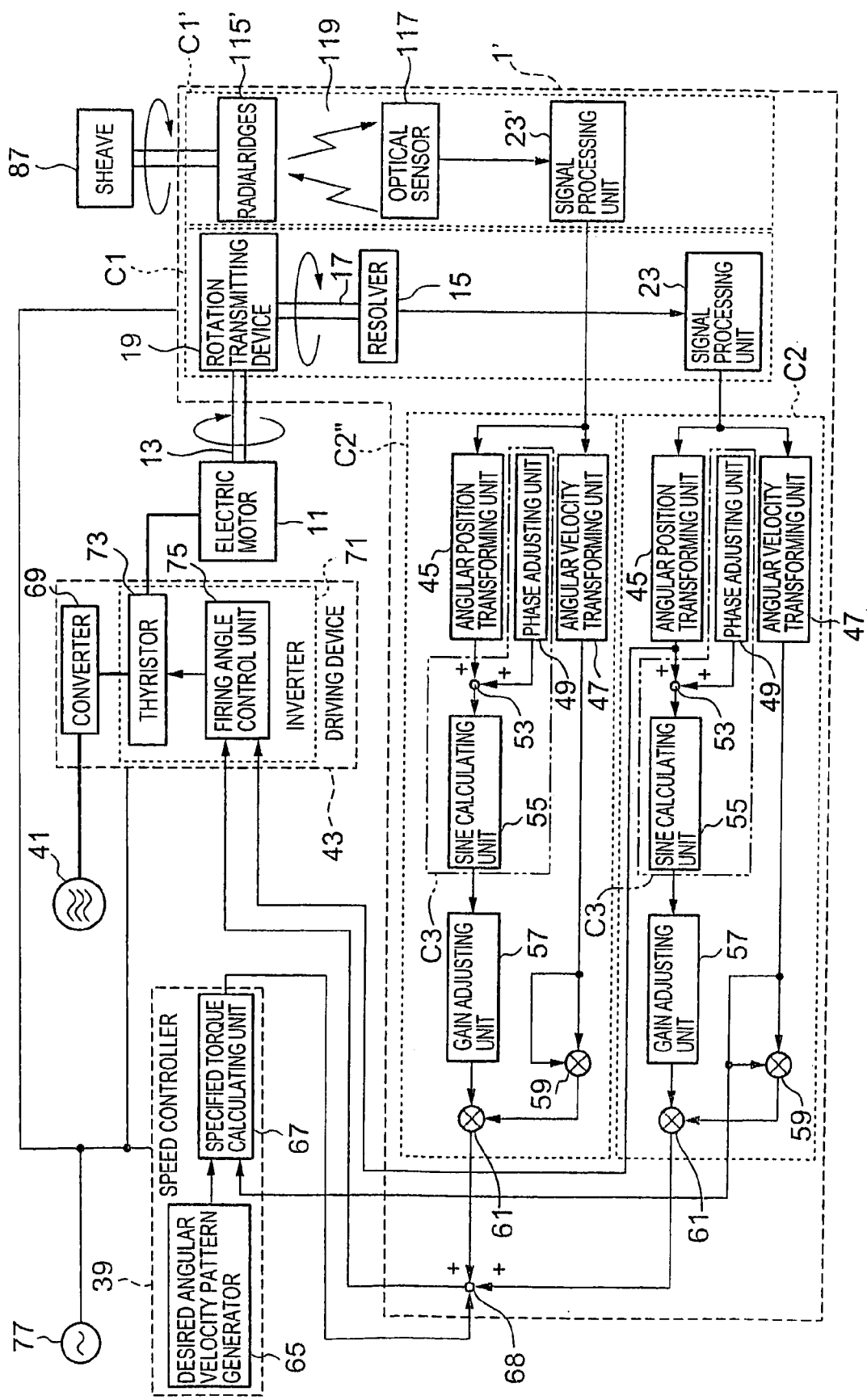
FIG. 11 is a block diagram of the vibration controller shown in FIG. 10.

In FIGS. 10 and 11, parts like or corresponding to those of the vibration controller 1 in the first embodiment are denoted by the same reference characters and the description thereof will be omitted, and components of the vibration controller 1' differing in construction or function from those of the vibration controller 1 are discriminated by attaching "'" or "''" to the reference characters from the corresponding components of the vibration controller 1.

The rotating motion measuring means C1' has an optical encoder 119' including a side wall of the sheave 87, i.e., a rotating member, provided with radial ridges 115' arranged at equal angular intervals about the axis of the side wall, and an optical device 117 included in a signal processing unit 23' attached to the upper end of a bearing 109 by a predetermined method. Information about the rotation of the sheave 87 is given through an angular position transforming unit 45 to the rotation calculating means C2'.

The rotation calculating means C2" calculates and provides a specified torque compensating value using Expression (2) to attenuate the vertical vibrations of a moving object 14.

$$F_{UB} = G_2 \omega^2 \sin(\theta + \psi_2) \qquad (2)$$

An adder 68', i.e., a dynamic balance adjusting adder, adds up the respective outputs of a specified torque calculating unit 67 and the rotation calculating means C2 and C2". The output of the adder 68' is given to a driving device 43 as a specified vertical vibration attenuating torque for attenuating the vertical vibrations of the moving object 14.

Third Embodiment

Figure 12:
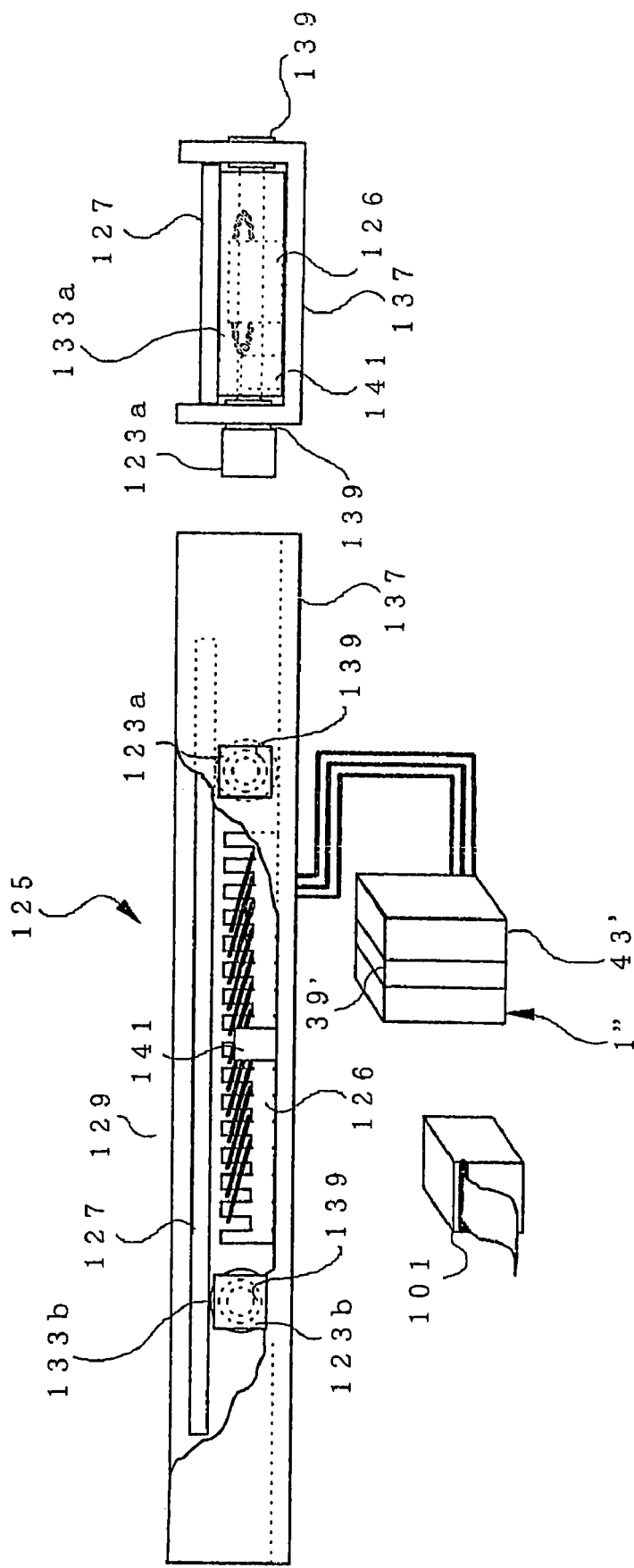
FIG. 12 is a uniaxial positioning table unit included in a vibration controller in a third embodiment according to the present invention.
Figure 13:
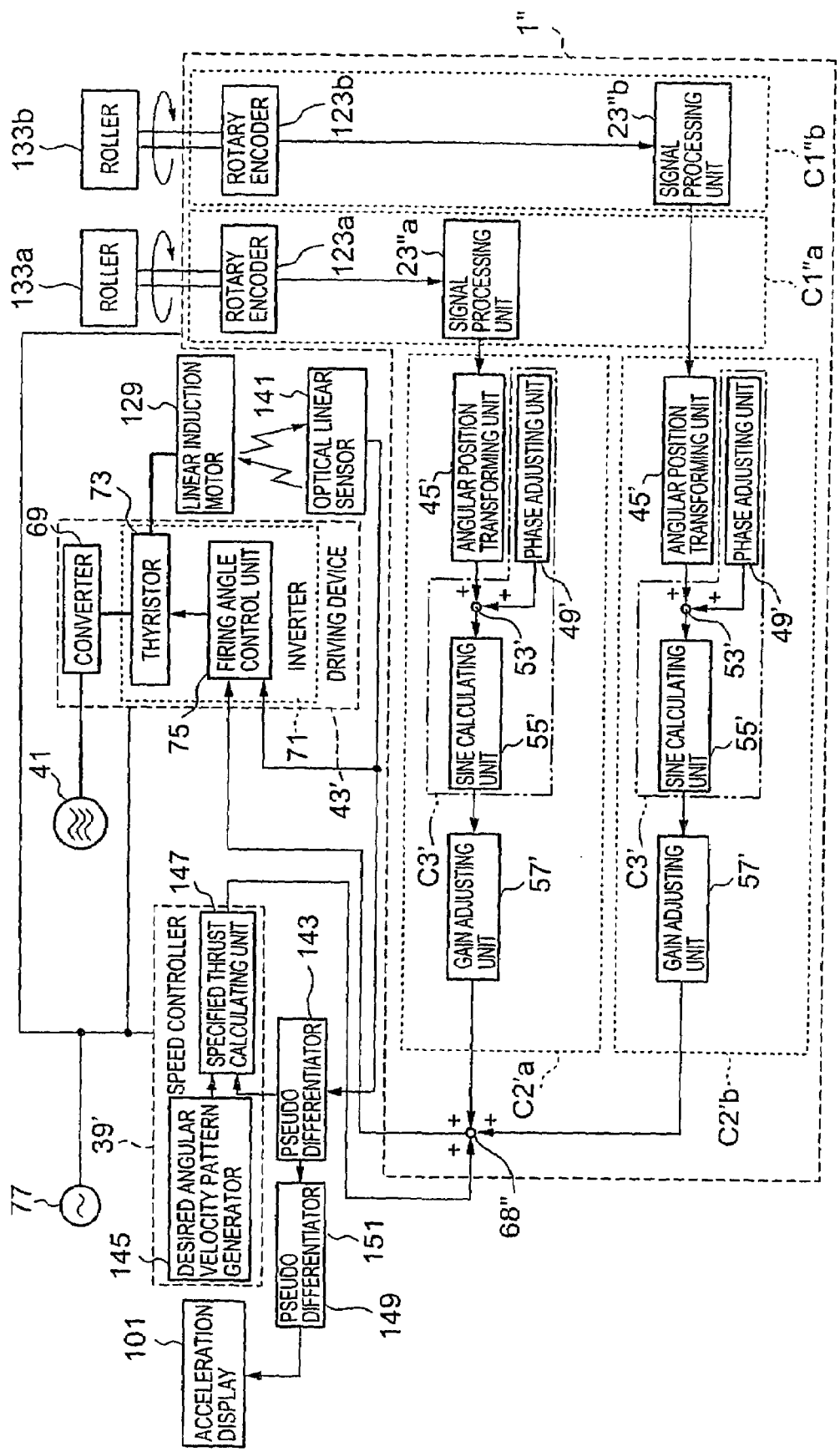
FIG. 13 is a block diagram of the vibration controller in the third embodiment.

A vibration controller 1" in a third embodiment according to the present invention will be described with reference to FIGS. 12 and 13. The vibration controllers 1 and 1' in the first and the second embodiment are applied to the elevator system in which the rotary electric motor is the driving force generating means, and the moving object 14 of the elevator system is the driven object. The driving force generating means and the driven object of the system to which the present invention is applied are not limited to the electric motor and the moving object 14. The vibration controller 1" in the third embodiment will be described as applied to a uniaxial positioning table system 125 in which the driven object is a positioning table 127, and the driving force generating means is a linear induction motor 129.

The uniaxial positioning table system 125 includes the linear induction motor 129 having a linear stator 126 and the positioning table 127 as a moving part, a driving device 43', i.e., a driving force generating means, that exerts a thrust equal to a specified thrust on the positioning table 127, rollers 133a and 133b supporting the positioning table 127 at positions near the opposite ends of the linear induction motor 129, a guide frame 137 having a U-shaped cross section, bearings 139 attached to the side walls of the guide frame 137 to support the rollers 133a and 133b for rotation, an optical linear sensor 141 for measuring the position of the positioning table 127, a speed controller 39' including a desired speed pattern generating device 145 and a specified thrust calculating unit 147, and rotary encoders 123a and 123b, i.e., rotating motion measuring means C1', having measuring shafts connected to the shafts of the rollers 133a and 133b by couplers, not shown, respectively. The specified thrust calculating unit 147 receives information about the position of the positioning table 127 measured by the optical linear sensor 141 through a pseudo-differentiator 143, receives the output of the desired speed pattern generating device 145, and provides a specified thrust to make the positioning table 127 move following a predetermined speed pattern.

The vibration controller 1" in the third embodiment is provided with a coupler, not shown, i.e., a rotation transmitting means 19, rotating motion measuring means C1"a and C1"b respectively including signal processing units 23"a and 23"b for converting the outputs of the rotary encoders 123a and 123b into corresponding voltages, respectively, rotation calculating means C2'a and C2'b that calculate compensating thrusts for attenuating vibrations, due to the eccentricities of the rollers 133a and 133b, of the positioning table 127 with respect to a direction in which the positioning table 127 is driven, and an adder 68", i.e., an eccentric vibration adjusting adder, that adds up the respective outputs of the rotation calculating means C2'a and C2'b and the speed controller 39'. Angular position transforming units 45' of the rotation calculating means C2'a and C2'b transform the outputs of the rotating motion measuring means C1a and C1b into angular positions of the rollers 133a and 133b, respectively.

If the roller 133a (133b) is eccentric, the gap length between the linear stator 126 and the positioning table 127 varies according to the rotation of the roller 133a (133b), and the thrust of the linear induction motor 129 varies in synchronism with the rotation of the roller 133a (133b). Consequently, the speed of the positioning table 127 follows the speed pattern, while the positioning table 127 vibrates in the driving direction. The vibration controller 1" in the third embodiment compensates the variation of the thrust of the linear induction motor 129 due to the eccentricity of the roller 133a (133b) so that the positioning table 127 may not vibrate in the driving direction.

Therefore, accuracy in machining the rollers 133a and 133b and accuracy in installing the rollers 133a and 133b do not need to be very high, which reduces the cost of the uniaxial positioning table system 125. Position information provided by the optical linear sensor 141 is transformed by two pseudo-differentiators 143 and 151 connected in series into an acceleration of the positioning table 127 to determine values to be provided by gain adjusting units 57' and phase adjusting units 49' included in the rotation calculating means C2'a and C2'b by the foregoing adjusting procedure, and parameters can be easily adjusted.

Fourth Embodiment

A vibration controller 1''' in a fourth embodiment according to the present invention will be described with reference to FIGS. 1, 3 and 14. The gain adjusting units and the phase adjusting units of the vibration controllers in the first to the third embodiment set fixed values, respectively. However, the gain adjusting units and the phase adjusting units may set proper predetermined values according to the operating condition of the driven object.

An elevator system 5 provided with the vibration controller 1''' in the fourth embodiment is similar to the elevator system 5 provided with the vibration controller 1 in the first embodiment, except that a moving object 14, i.e., a driven object, included in the former elevator system 5 travels a long, vertical stroke, and the maximum acceleration and the maximum speed of the moving object 14 are high. The elevator system 5 is provided with rubber vibration isolators 105 having a high elasticity not to transmit vibrations generated by rotary electric motor 11 to the floor in moving the moving object 14 at the maximum speed.

A speed controller 39 provides a set-speed signal V on the basis of a maximum set speed for the moving object 14 of the elevator system 5, and a direction signal D specifying a rotating direction in which the output shaft of the electric motor 11 is to be rotated. The vibration controller 1''' is provided with a rotating motion measuring means C1, rotation calculating means C2 and C2''', a gain changing unit 153 that provides a predetermined value on the basis of the set-speed signal V, a phase changing unit 155, a phase setting unit 157 that provides a predetermined value on the basis of the set-speed signal V and the direction signal D, and an adder 159 that adds up the respective outputs of the phase changing unit 155 and the phase setting unit 157.

In the rotation calculating means C2, values to be provided by the gain adjusting unit 57 and the phase adjusting unit 49 are adjusted to predetermined values on the basis of the respective outputs of the gain changing unit 153 and the adder 159.

The rotation calculating means C2''' includes an angular acceleration transforming unit 161 that transforms the output of the angular velocity transforming unit 47 into a corresponding angular acceleration ($\alpha$) of the rotor shaft 13, an angular position transforming unit 45's (integrator) that provides an angular position ($\theta$) of the rotor shaft 13, a phase adjusting unit 49" for setting a phase angle corresponding to the output ($\theta$) provided by the angular position transforming unit 45's on the basis of the output of the adder 159, an adder 53" that adds up the output ($\psi_3$) of the phase adjusting unit 49" and the output ($\theta$) of the angular position transforming unit 45's to provide an output ($\theta+\psi_3$) a cosine calculating unit 55" that calculates the cosine ($\cos(\theta+\psi_3)$) of the output ($\theta+\psi_3$), a gain adjusting unit 57" that sets an amplitude ($G_3$) for the output of the cosine calculating unit 55" on the basis of the output of the gain changing unit 153, and a multiplier 61" (angular acceleration multiplying unit) that multiplies the output ($G_3 \cos(\theta+\psi_3)$) of the gain adjusting unit 57" by the output (α) of the angular acceleration calculating unit 161. The phase adjusting unit 49'', the adder 53'' and the cosine calculating unit 55'' constitute a trigonometric function calculating device C3''. An adder 68'', i.e., a multiple vibration adjusting adder, adds up the output of a multiplier 61 (an angular velocity multiplying unit), namely, the output of the rotation calculating means C2, the output of the multiplier 61'', namely, the output of the rotation calculating means C2''', and the output of a specified torque calculating unit 67.

The sum of the outputs of the rotation calculating means C2 and C2''' given to the adder 68'' is given by Expression (3).

$$F_{CF} = G_3(\omega^2 \sin(\theta + \psi_3) + \alpha \cos(\theta + \psi_3)) \quad (3)$$

Consequently, a specified torque calculated by using Expression (29) is given to the driving device 43.

$$T_r = T_0 + \frac{k_r}{r_m}(-\omega_d^2 \sin(\theta_d + \phi_r) + \alpha \cos(\theta_d + \phi_r)) \quad (29)$$

If a sheave 37, included in this elevator system 5, in which the moving object 14 travels a long, vertical stroke, the maximum acceleration and the maximum set speed of the moving object 14 are high, and the rubber vibration isolators 105 have a low elasticity coefficient, is eccentric, the eccentricity-related shaking force due to the eccentricity of the sheave 37 increases excessively when the moving object 14 is moved at the maximum speed and when the moving object 14 moving at the maximum speed is accelerated or decelerated, and the moving object 14 generates longitudinal vibrations. If the rubber vibration isolators 105 have a low elasticity coefficient, a motor unit 104 is vibrated vertically by the excessively high shaking force due to the eccentricity of the sheave 37 on the rubber vibration isolators 105. This vertical vibrations of the motor unit 104 act, in addition to the shaking force due to the eccentricity of the sheave 37, on the moving object 14. The amplitude of the resultant shaking force of the vertical vibrations of the motor unit 104 and the shaking force due to the eccentricity of the sheave 37 and the phase difference between the resultant shaking force and the angular position of the rotor shaft 13 change at the maximum speed and the set acceleration. The phase difference is dependent also on the rotating direction of the output shaft of the electric motor 11. Therefore, even if the gain adjusting units 57 and 57'' and the phase adjusting units 49 and 49'' are adjusted so that the vertical vibrations of the moving object 14 can be attenuated when the moving object 14 is ascending at a particular maximum set speed, the longitudinal vibrations of the moving object 14 cannot be attenuated while the moving object 14 is descending. If the maximum set speed is changed, the moving object 14 is vibrated longitudinally both while the same is ascending and while the same is descending.

Figure 14:
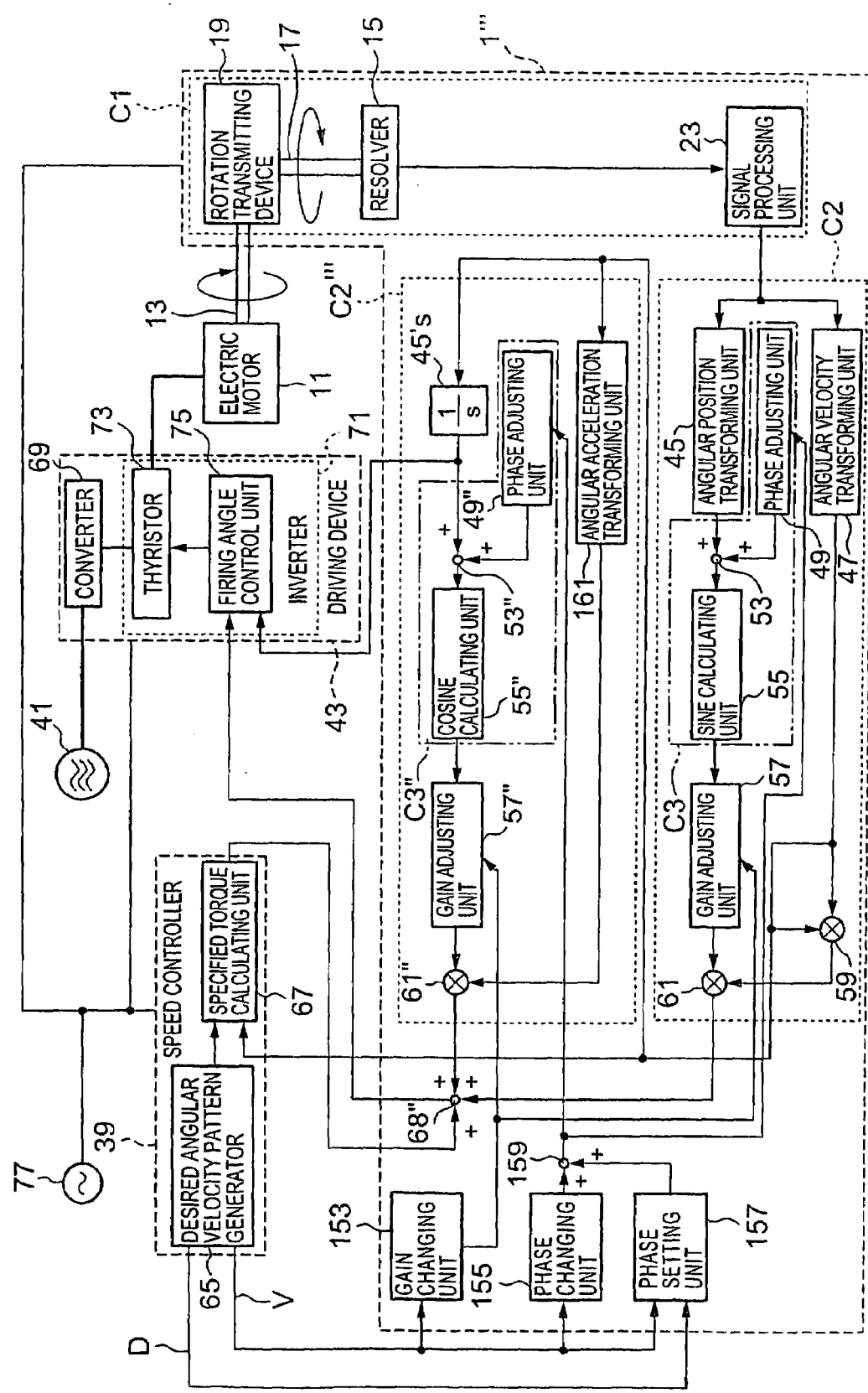
FIG. 14 is a block diagram of a vibration controller in a fourth embodiment according to the present invention.

In the vibration controller 1''' in the fourth embodiment having a configuration as shown in FIG. 14, the gain changing unit 153, the phase changing unit 155 and the phase setting unit 157 set properly the gains ($G_3$) of the gain adjusting units 57 and 57'' and the phase differences ($\psi_3$) of the phase adjusting units 49 and 49'' according to the maximum set speed and the rotating direction of the output shaft of the electric motor 11. Since the resultant shaking force can be regarded as an eccentricity-related shaking force having an amplitude and a phase difference that change according to the maximum set speed and the rotating direction of the output shaft of the electric motor 11, the eccentricity-related shaking force given by Expression (28) is cancelled out by a specified torque given by Expression (29). Thus, the longitudinal vibrations of the moving object 14 can be attenuated in every operating mode.

$$F_d(s) = L[m_d r_d(-\omega_d^2 \sin(\theta_d + \psi_d) + \alpha \cos(\theta_d + \psi_d))]R(s) \quad (28)$$

$$T_r = T_0 + \frac{k_r}{r_m}(-\omega_d^2 \sin(\theta_d + \phi_r) + \alpha \cos(\theta_d + \phi_r)) \quad (29)$$

Thus, the moving object 14 generates any longitudinal vibrations neither during ascent nor during descent, and the moving object 14 does not generate any longitudinal vibrations even if the maximum set speed is low for the silent night operation of the elevator system 5.

Moreover, although the angular position calculating devices of the foregoing embodiments are supposed to be analog devices, the angular position calculating devices may be either analog devices or digital devices.

As apparent from the foregoing description, the vibration controller of the present invention is capable of effectively reducing the vibrations of the driven object due to the dynamic unbalance and/or eccentricity of the rotating member without improving the mechanical accuracy of the component of the system and without enhancing the rigidity of the controlled system and, consequently, the system can be constructed at low costs. Since the driven object is not exposed to detrimental vibrations and the system is unbreakable, the reliability of the system can be improved.

The present invention may be modified otherwise than as specifically described herein without departing from the scope and spirit thereof.

The invention claimed is:

1. A vibration controller comprising:
   a driving force generating means for driving a driven object;
   a rotating member driven for rotation by the driving force of the driving force generating means;
   a driving force specifying means for specifying a thrust or a torque to be generated by the driving force generating means;
   a rotating motion measuring means for measuring rotating motions of the rotating member;
   a rotation calculating means including: an angular position transforming unit that provides an angular position of the rotating member based on an output of the rotating motion measuring means; a trigonometric function processing unit that calculates a sine or a cosine of an angle expressed by a linear function of the angular position outputted from the rotating motion measuring means; and a gain adjusting unit that multiplies an output of the trigonometric function processing unit by a predetermined gain; and
   a specified driving force correcting means for correcting an output of the driving force specifying means based on result of calculation made by the rotation calculating means.

2. The vibration controller according to claim 1, wherein the rotation calculating means further includes a phase adjusting unit that provides an adjusting phase as an intercept of a linear function of the output of the angular position transforming unit, the angle expressed by the linear function of the angular position is obtained by adding the adjusting phase to the angular position, and the trigonometric function calculating unit is configured to calculate a sine or cosine of the angle obtained by adding the adjusting phase to the angular position.

3. The vibration controller according to claim 1, wherein the rotation calculating means further includes an angular velocity transforming unit that provides an angular velocity of the rotating member based on an output of the rotating motion measuring means, and an angular velocity multiplying unit that multiplies an output of the trigonometric function calculating unit or the gain adjusting unit by a square of an angular velocity provided by the angular velocity transforming unit.

4. The vibration controller according to claim 1, wherein the rotation calculating means further includes an angular acceleration transforming unit that provides an angular acceleration of the rotating member on the basis of an output of the rotating motion measuring means, and an angular acceleration multiplying unit that multiplies an output of the trigonometric function calculating unit or the gain adjusting unit by an output of the angular acceleration transforming unit.

5. The vibration controller according to claim 1, wherein the specified driving force correcting means includes an adder that adds up respective outputs of the driving force specifying means and the gain adjusting unit.

6. The vibration controller according to claim 3, wherein the specified driving force correcting means includes an adder that adds up respective outputs of the driving force specifying means and the angular acceleration multiplying unit.

7. The vibration controller according to claim 4, wherein the specified driving force correcting means includes an adder that adds up respective outputs of the angular acceleration multiplying unit and the angular velocity multiplying unit.

8. The vibration controller according to claim 3, wherein the specified driving force correcting means includes an adder that adds up respective outputs of the driving force specifying means, the angular velocity multiplying unit and the gain adjusting unit.

9. The vibration controller according to claim 4, wherein the specified driving force correcting means includes an adder that adds up respective outputs of the driving force specifying means, the angular acceleration multiplying unit, the angular velocity multiplying unit and the gain adjusting unit.

10. The vibration controller according to claim 2, wherein the rotation calculating means calculates an eccentricity compensating value $F_{CD}$ for compensating an eccentricity of the rotating member by using the following expression:

$$F_{CD}=G_1 \sin(\theta+\psi_1)$$

where $\theta$ is the angular position, $G_1$ is a gain used by the gain adjusting unit, and $\psi_1$ is an adjusting phase used by the phase adjusting unit, and the specified driving force correcting means corrects an output of the driving force specifying means on the basis of the eccentricity compensation $F_{CD}$.

11. The vibration controller according to claim 3, wherein the rotation calculating means includes a phase adjusting unit that provides an adjusting phase as an intercept of a linear function of an output of the angular position transforming unit;

the rotation calculating means calculates a dynamic unbalance compensating value $F_{UB}$ for compensating dynamic unbalance of the rotating member by using the following expression:

$$F_{UB}=G_2\omega^2 \sin(\theta+\psi_2)$$

where $\theta$ is the angular position, $\omega$ is the angular velocity, $G_2$ is a gain used by the gain adjusting unit, and $\psi_2$ is a adjusting phase used by the phase adjusting unit; and the specified driving force correcting means corrects an output of the driving force specifying means on the basis of the dynamic unbalance compensating value $F_{CD}$.

12. The vibration controller according to claim 4, wherein the rotation calculating means includes a phase adjusting unit that provides an adjusting phase as an intercept of a linear function of an output of the angular position transforming unit;

the rotation calculating means calculate an eccentricity unbalance compensating value $F_{CF}$ for compensating an eccentricity-related unbalance of the rotating member by using the following expression:

$$F_{CF}=G_3(\omega^2 \sin(\theta+\psi_3)+\alpha \cos(\theta+\psi_3))$$

where $\theta$ is the angular position, $\omega$ is the angular velocity, $\alpha$ is the angular acceleration, $G_3$ is the gain used by the gain adjusting unit, and $\psi_3$ is an adjusting phase used by the phase adjusting unit; and the specified driving force correcting means corrects an output of the driving force specifying means on the basis of the eccentricity unbalance compensating value $F_{CF}$.

13. The vibration controller according to claim 1, wherein the rotation calculating means includes a gain changing means for setting a gain of the gain adjusting unit by changing a plurality of predetermined values according to an operating condition of the driven object.

14. The vibration controller according to claim 2, wherein angular position calculating means includes a phase changing means for setting a phase of the phase adjusting unit by changing a plurality of predetermined values according to an operating condition of the driven object.

15. The vibration controller according to claim 2, wherein the rotation calculating means includes a phase setting device that sets a phase of the phase adjusting unit according to a rotating direction of the rotating member.

16. The vibration controller according to claim 3, wherein the angular position transforming unit includes an integrator for integrating an output of the angular velocity transforming unit.

17. The vibration controller according to claim 1 further comprising a vibration measuring means for measuring vibrations with respect to a direction in which the driven object is driven.

18. The vibration controller according to claim 17, wherein the vibration measuring means includes an acceleration measuring means for measuring an acceleration of the driven object.

19. The vibration controller according to claim 1, wherein the rotating motion measuring means includes a resolver.

20. The vibration controller according to claim 1, wherein the rotating motion measuring means includes a generator.

21. The vibration controller according to claim 1, wherein the rotating motion measuring means includes an encoder.

22. The vibration controller according to claim 1, wherein the rotating member is a rotor included in an electric motor.

23. The vibration controller according to claim 1, wherein the rotating member is a main sheave included in an elevator system.

24. The vibration controller according to claim 1, wherein the rotating member is a compensator sheave included in an elevator system.

25. The vibration controller according to claim 1, wherein the driven object is an elevator car included in an elevator system.

26. A method of controlling vibrations of a driven object included in a system comprising a driving force generating means for driving the driven object, a rotating member driven for rotation by driving force of the driving force generating means, and a driving force specifying means for specifying a thrust or a torque to be generated by the driving force generating means, by correcting an output provided by the driving force specifying means by using a predetermined compensating value, said method comprising:
- a rotating motion measuring step including a step of measuring an angular position of the rotating member;
- a calculating step including a step of obtaining a product of a sine or cosine of an angle as a linear function of the angular position and a gain, and a step of calculating a compensating value based on the product; and
- a determining step including a step of determining a gain that reduces amplitude of a predetermined vibrational component generated in the driven object to a minimum.

27. The vibration control method according to claim 26, wherein the calculating step uses an angle obtained by adding an adjusting phase value to the angular position as the angle that can be expressed by the linear function of angular position, and
- the determining step further includes a step of determining the adjusting phase value so that the amplitude of the predetermined vibrational component generated in the driven object is reduced to a minimum.

28. The vibration control method according to claim 26, wherein the rotating motion measuring step further includes a step of measuring an angular velocity of the rotating member, and wherein the calculating step calculates the compensating value based on the product of the product of the sine or cosine and the gain, and the angular velocity of the rotating member.

29. The vibration control method according to claim 26, wherein the rotating motion measuring step further includes a step of measuring an angular acceleration of the rotating member, and wherein the calculating step calculates the compensating value based on the product of the product of the sine or cosine and the gain, and the angular acceleration of the rotating member.

* * * * *